(12) United States Patent
Boloorian

(10) Patent No.: US 12,553,995 B2
(45) Date of Patent: Feb. 17, 2026

(54) DATA REFINEMENT IN OPTICAL SYSTEMS

(71) Applicant: SiLC Technologies, Inc., Monrovia, CA (US)

(72) Inventor: Majid Boloorian, San Diego, CA (US)

(73) Assignee: SiLC Technologies, Inc., Monrovia, CA (US)

(*) Notice: Subject to any disclaimer, the term of this patent is extended or adjusted under 35 U.S.C. 154(b) by 1035 days.

(21) Appl. No.: 17/671,539

(22) Filed: Feb. 14, 2022

(65) Prior Publication Data

US 2023/0258786 A1 Aug. 17, 2023

(51) Int. Cl.
| | |
|---|---|
| *G01S 7/4911* | (2020.01) |
| *G01S 7/48* | (2006.01) |
| *G01S 7/4913* | (2020.01) |
| *G01S 7/4915* | (2020.01) |
| *G01S 17/34* | (2020.01) |
| *G01S 17/89* | (2020.01) |

(52) U.S. Cl.
CPC ........... *G01S 7/4911* (2013.01); *G01S 7/4808* (2013.01); *G01S 7/4913* (2013.01); *G01S 7/4915* (2013.01); *G01S 17/34* (2020.01); *G01S 17/89* (2013.01)

(58) Field of Classification Search
CPC .... G01S 7/4911; G01S 7/4808; G01S 7/4913; G01S 7/4915; G01S 17/34; G01S 17/89
USPC .......................................................... 356/5
See application file for complete search history.

(56) References Cited

U.S. PATENT DOCUMENTS

| | | | |
|---|---|---|---|
| 4,168,906 A | * | 9/1979 | Schwiesow ............. G01S 17/88 356/28 |
| 4,262,993 A | | 4/1981 | Burns et al. |
| 4,472,020 A | | 9/1984 | Evanchuk |

(Continued)

FOREIGN PATENT DOCUMENTS

| | | |
|---|---|---|
| CN | 1668939 A | 9/2005 |
| CN | 101356450 A | 1/2009 |

(Continued)

OTHER PUBLICATIONS

Aalto, Timo eta l., "VTT's Micron-Scale Silicon Rib+Strip Waveguide Platform", pp. 1-8, May 13, 2016, Conference Proceedings of SPIE Photonics Europe Conference, Proc. SPIE 9891, Silicon Photonics and Photonic Integrated Circuits V, 98911G, doi: 10.1117/12.2234588.

(Continued)

*Primary Examiner* — Robert W Hodge
*Assistant Examiner* — Kara Richter
(74) *Attorney, Agent, or Firm* — Gavrilovich, Dodd & Lindsey LLP

(57) ABSTRACT

The optical system is configured to output a system output signal such that a frequency of the system output signal changes in a series of repeated cycles. Each of the cycles includes multiple data periods. The frequency of the system output signal changes at different rates during different data periods. The optical system includes a light-combining component that combines light that returns to the optical system from the system output signal with light from a reference signal so as to generate a beating signal beating at a beat frequency. The system includes electronics that generate frequency change data that indicates a beat frequency change over time. The electronics can apply edge detection (Continued)

criteria and/or outlier detection criteria to the frequency change data.

37 Claims, 13 Drawing Sheets

(56) References Cited

U.S. PATENT DOCUMENTS

| | | |
|---|---|---|
| 4,523,803 A | 6/1985 | Arao et al. |
| 4,786,132 A | 11/1988 | Gordon |
| 4,845,703 A | 7/1989 | Suzuki |
| 4,914,665 A | 4/1990 | Sorin |
| 4,955,028 A | 9/1990 | Alfeness et al. |
| 4,987,832 A | 1/1991 | Klink et al. |
| 4,995,720 A | 2/1991 | Amzajerdian |
| 5,041,832 A | 8/1991 | Gulczynski |
| 5,194,906 A | 3/1993 | Kimura et al. |
| 5,289,252 A | 2/1994 | Nourrcier |
| 5,305,412 A | 4/1994 | Paoli |
| 5,323,223 A | 6/1994 | Hayes |
| 5,396,328 A | 3/1995 | Jestel et al. |
| 5,500,910 A | 3/1996 | Boudreau et al. |
| 5,847,816 A | 12/1998 | Zediker et al. |
| 5,889,490 A | 3/1999 | Wachter et al. |
| 5,953,468 A | 9/1999 | Finnila et al. |
| 5,977,538 A | 11/1999 | Unger et al. |
| 5,995,810 A | 11/1999 | Karasawa |
| 6,035,083 A | 3/2000 | Brennan, III et al. |
| 6,040,898 A | 3/2000 | Mrosik et al. |
| 6,108,472 A | 8/2000 | Rickman et al. |
| 6,400,500 B1 | 6/2002 | Tidmarsh et al. |
| 6,480,513 B1 | 11/2002 | Kapany et al. |
| 6,556,759 B2 | 4/2003 | Roberts et al. |
| 6,567,573 B1 | 5/2003 | Domash et al. |
| 6,687,010 B1 | 2/2004 | Horri et al. |
| 6,921,490 B1 | 7/2005 | Qian et al. |
| 6,959,133 B2 | 10/2005 | Vancoill et al. |
| 6,970,621 B1 | 11/2005 | Fried |
| 6,977,502 B1 | 12/2005 | Hertz |
| 7,345,744 B2 | 3/2008 | Halmos et al. |
| 7,375,877 B1 | 5/2008 | Di Teodoro et al. |
| 7,535,390 B2 | 5/2009 | Hsu |
| 7,907,333 B2 | 3/2011 | Coyle |
| 8,165,433 B2 | 4/2012 | Jenkins et al. |
| 8,213,751 B1 | 7/2012 | Ho et al. |
| 8,311,374 B2 | 11/2012 | Hochberg et al. |
| 8,326,100 B2 | 12/2012 | Chen et al. |
| 8,410,566 B2 | 4/2013 | Qian et al. |
| 8,541,744 B1 | 9/2013 | Liu |
| 8,558,993 B2 | 10/2013 | Newbury et al. |
| 8,885,678 B1 | 11/2014 | Kupershmidt |
| 9,157,790 B2 | 10/2015 | Shpunt et al. |
| 9,176,282 B2 | 11/2015 | Pottier et al. |
| 9,217,831 B1 | 12/2015 | Asghari |
| 9,235,097 B2 | 1/2016 | Meade et al. |
| 9,310,471 B2 | 4/2016 | Sayyah et al. |
| 9,310,487 B2 | 4/2016 | Sakimura et al. |
| 9,519,052 B2 | 12/2016 | Gusev |
| 9,575,341 B2 | 2/2017 | Heck et al. |
| 9,606,234 B2 | 3/2017 | Major, Jr. et al. |
| 9,625,580 B2 | 4/2017 | Kotelnikov et al. |
| 9,735,885 B1 | 8/2017 | Sayyah et al. |
| 9,740,079 B1 | 8/2017 | Davids et al. |
| 9,748,726 B1 | 8/2017 | Morton et al. |
| 9,753,351 B2 | 9/2017 | Eldada |
| 9,778,363 B2 | 10/2017 | Kadambi et al. |
| 9,798,166 B1 | 10/2017 | Sharma et al. |
| 9,823,118 B2 | 11/2017 | Doylend et al. |
| 9,841,495 B2 | 12/2017 | Campbell et al. |
| 9,851,443 B2 | 12/2017 | Chen |
| 9,857,468 B1 | 1/2018 | Eichenholz et al. |
| 9,893,737 B1 | 2/2018 | Keramat et al. |
| 10,003,168 B1 | 6/2018 | Villeneuve |
| 10,007,060 B1 | 6/2018 | Qian et al. |
| 10,094,916 B1 | 10/2018 | Droz et al. |
| 10,137,903 B2 | 11/2018 | Tascione et al. |
| 10,222,474 B1 | 3/2019 | Raring et al. |
| 10,274,599 B2 | 4/2019 | Schmalenberg |
| 10,281,322 B2 | 5/2019 | Doylend et al. |
| 10,345,447 B1 | 7/2019 | Hicks |
| 10,345,497 B2 | 7/2019 | Wu et al. |
| 10,397,019 B2 | 8/2019 | Hartung et al. |
| 10,564,268 B2 | 2/2020 | Turbide et al. |
| 10,605,901 B2 | 3/2020 | Lee et al. |
| 10,627,496 B2 | 4/2020 | Schmalenberg et al. |
| 10,649,306 B2 | 5/2020 | Skirlo et al. |
| 10,739,256 B1 | 8/2020 | Rickman et al. |
| 10,761,195 B2 | 9/2020 | Donovan |
| 10,782,782 B1 | 9/2020 | DeSalvo et al. |
| 10,788,582 B2 | 9/2020 | Feng et al. |
| 10,816,649 B1 | 10/2020 | Keyser et al. |
| 10,845,480 B1 | 11/2020 | Shah et al. |
| 10,901,074 B1 | 1/2021 | Pan et al. |
| 10,962,713 B2 | 3/2021 | Lee |
| 11,022,683 B1 | 6/2021 | Rezk |
| 11,067,668 B1 | 7/2021 | Bravo |
| 11,114,815 B1 | 9/2021 | Chen et al. |
| 11,119,219 B1 | 9/2021 | LaChapelle et al. |
| 11,162,789 B2 | 11/2021 | Lodin et al. |
| 11,170,476 B1 | 11/2021 | Toshiwal et al. |
| 11,175,388 B1 | 11/2021 | Wood et al. |
| 11,221,404 B1 | 1/2022 | DeSalvo et al. |
| 11,300,683 B2 | 4/2022 | Bao et al. |
| 11,378,691 B2 | 7/2022 | Boloorian et al. |
| 11,448,729 B2 | 9/2022 | Baba et al. |
| 11,454,724 B2 | 9/2022 | Michaels et al. |
| 11,486,975 B1 | 11/2022 | Xiao |
| 11,493,753 B1 | 11/2022 | Wood et al. |
| 11,525,916 B2 | 12/2022 | Avci et al. |
| 11,536,805 B2 | 12/2022 | Asghari et al. |
| 11,579,300 B1 | 2/2023 | Li |
| 11,635,491 B2 | 4/2023 | Asghari et al. |
| 11,714,167 B2 | 8/2023 | Feng et al. |
| 11,815,720 B1 | 11/2023 | Tavallaee et al. |
| 11,860,304 B2 * | 1/2024 | Ren .................. G06V 20/64 |
| 11,908,075 B2 | 2/2024 | Gorantla |
| 2002/0031304 A1 | 3/2002 | Roberts et al. |
| 2002/0105632 A1 | 8/2002 | Holton |
| 2002/0122398 A1 | 9/2002 | Jou |
| 2002/0159700 A1 | 10/2002 | Coroy et al. |
| 2003/0030582 A1 | 2/2003 | Vickers |
| 2003/0031407 A1 | 2/2003 | Weisberg et al. |
| 2003/0142943 A1 | 7/2003 | Yegnanarayanan et al. |
| 2003/0212520 A1 | 11/2003 | Campos et al. |
| 2003/0231686 A1 | 12/2003 | Liu |
| 2004/0081388 A1 | 4/2004 | Koyama |
| 2004/0085612 A1 | 5/2004 | Livingston et al. |
| 2004/0233964 A1 | 11/2004 | Yamanaka et al. |
| 2004/0249561 A1 | 12/2004 | Capozzi et al. |
| 2005/0123227 A1 | 6/2005 | Vonsovici et al. |
| 2005/0135730 A1 | 6/2005 | Welch et al. |
| 2005/0213103 A1 | 9/2005 | Everett et al. |
| 2005/0219068 A1 | 10/2005 | Jones et al. |
| 2005/0237617 A1 | 10/2005 | Carr et al. |
| 2005/0244103 A1 | 11/2005 | Kwakernaak |
| 2006/0114447 A1 | 6/2006 | Harris et al. |
| 2007/0024849 A1 | 2/2007 | Carrig et al. |
| 2007/0024956 A1 | 2/2007 | Coyle |
| 2007/0036486 A1 | 2/2007 | Miyadera et al. |
| 2007/0103362 A1 | 5/2007 | Arikan et al. |
| 2007/0171407 A1 | 7/2007 | Cole et al. |
| 2007/0223856 A1 | 9/2007 | Nunoya et al. |
| 2008/0088184 A1 | 4/2008 | Tung et al. |
| 2008/0123170 A1 | 5/2008 | Reichert et al. |
| 2008/0174461 A1 | 7/2008 | Hsu |
| 2008/0176681 A1 | 7/2008 | Donahoe |
| 2008/0181550 A1 | 7/2008 | Earnshaw |
| 2008/0205461 A1 | 8/2008 | Henrichs |
| 2009/0046746 A1 | 2/2009 | Munroe et al. |
| 2009/0128797 A1 | 5/2009 | Walsh |
| 2009/0195769 A1 | 8/2009 | Luo et al. |
| 2009/0279070 A1 | 11/2009 | Ueno |
| 2009/0309782 A1 * | 12/2009 | Takabayashi ......... G01S 13/343 |
| | | 342/105 |

(56) References Cited

U.S. PATENT DOCUMENTS

| | | |
|---|---|---|
| 2010/0027379 A1 | 2/2010 | Saulnier et al. |
| 2010/0085992 A1 | 4/2010 | Rakuljic et al. |
| 2010/0159858 A1 | 6/2010 | Dent et al. |
| 2010/0187442 A1 | 7/2010 | Hochberg et al. |
| 2010/0271614 A1 | 10/2010 | Albuquerque et al. |
| 2010/0277714 A1 | 11/2010 | Pedersen et al. |
| 2010/0280765 A1 | 11/2010 | Marquardt et al. |
| 2010/0296077 A1 | 11/2010 | Scott et al. |
| 2010/0309391 A1 | 12/2010 | Plut |
| 2011/0026643 A1 | 2/2011 | Ruelke et al. |
| 2011/0068425 A1 | 3/2011 | Liao et al. |
| 2011/0068426 A1 | 3/2011 | Zheng et al. |
| 2011/0091155 A1 | 4/2011 | Yilmaz et al. |
| 2011/0095167 A1 | 4/2011 | Feng et al. |
| 2011/0141471 A1 | 6/2011 | Schlotterbeck et al. |
| 2011/0164845 A1 | 7/2011 | Jenkins et al. |
| 2011/0241895 A1 | 10/2011 | Griffin |
| 2012/0038506 A1 | 2/2012 | Kanamoto et al. |
| 2012/0062230 A1 | 3/2012 | Vaughan, Jr. et al. |
| 2012/0081786 A1 | 4/2012 | Mizuyama et al. |
| 2012/0098935 A1 | 4/2012 | Schmidt et al. |
| 2012/0120382 A1 | 5/2012 | Silny et al. |
| 2012/0182544 A1 | 7/2012 | Asahara et al. |
| 2012/0206712 A1 | 8/2012 | Chang et al. |
| 2013/0044309 A1 | 2/2013 | Dakin et al. |
| 2013/0044311 A1 | 2/2013 | Rakuljic |
| 2013/0051655 A1 | 2/2013 | Collard et al. |
| 2013/0056623 A1 | 3/2013 | Lipson et al. |
| 2013/0083389 A1 | 4/2013 | Dakin et al. |
| 2013/0094074 A1 | 4/2013 | Asghari et al. |
| 2013/0162976 A1 | 6/2013 | Dakin et al. |
| 2013/0206967 A1 | 8/2013 | Shpunt et al. |
| 2013/0242400 A1 | 9/2013 | Chen |
| 2013/0321791 A1 | 12/2013 | Feldkhun et al. |
| 2014/0035776 A1 | 2/2014 | Sochen et al. |
| 2014/0036252 A1 | 2/2014 | Amzajerdian et al. |
| 2014/0054451 A1 | 2/2014 | Abedin et al. |
| 2014/0112357 A1 | 4/2014 | Abedin et al. |
| 2014/0133864 A1 | 5/2014 | Asghari et al. |
| 2014/0153931 A1 | 6/2014 | Doerr |
| 2014/0169392 A1 | 6/2014 | Kim |
| 2014/0211298 A1 | 7/2014 | Sayyah et al. |
| 2014/0269790 A1 | 9/2014 | Sebastian et al. |
| 2014/0332918 A1 | 11/2014 | Li et al. |
| 2014/0376000 A1 | 12/2014 | Swanson et al. |
| 2014/0376001 A1 | 12/2014 | Swanson |
| 2015/0055115 A1 | 2/2015 | Pedersen et al. |
| 2015/0056740 A1 | 2/2015 | Menezo |
| 2015/0109603 A1 | 4/2015 | Kim et al. |
| 2015/0171593 A1 | 6/2015 | Duan et al. |
| 2015/0177367 A1 | 6/2015 | Sebastian et al. |
| 2015/0177383 A1 | 6/2015 | Ruff et al. |
| 2015/0185244 A1 | 7/2015 | Inoue et al. |
| 2015/0207296 A1 | 7/2015 | Rickman et al. |
| 2015/0333480 A1 | 11/2015 | Santis et al. |
| 2015/0346340 A1 | 12/2015 | Yaacobi et al. |
| 2015/0378012 A1 | 12/2015 | Sayyah et al. |
| 2015/0378187 A1 | 12/2015 | Heck et al. |
| 2016/0084945 A1 | 3/2016 | Rodrigo et al. |
| 2016/0161600 A1 | 6/2016 | Eldada et al. |
| 2016/0170141 A1 | 6/2016 | Luo et al. |
| 2016/0209594 A1 | 7/2016 | Bahl |
| 2016/0223663 A1 | 8/2016 | Schmalenberg et al. |
| 2016/0261091 A1 | 9/2016 | Santis et al. |
| 2016/0274226 A1 | 9/2016 | Lewis |
| 2016/0290891 A1 | 10/2016 | Feng et al. |
| 2016/0291135 A1 | 10/2016 | Ando et al. |
| 2016/0299228 A1 | 10/2016 | Maleki et al. |
| 2016/0306043 A1 | 10/2016 | Moss et al. |
| 2016/0324438 A1 | 11/2016 | Halpern et al. |
| 2016/0341818 A1 | 11/2016 | Gilliland et al. |
| 2016/0373191 A1 | 12/2016 | Fathololoumi et al. |
| 2016/0377721 A1 | 12/2016 | Lardin et al. |
| 2017/0003451 A1 | 1/2017 | Ma et al. |
| 2017/0040775 A1 | 2/2017 | Takabayashi et al. |
| 2017/0059779 A1 | 3/2017 | Okayama |
| 2017/0067985 A1 | 3/2017 | Schwarz et al. |
| 2017/0098917 A1 | 4/2017 | Popovic et al. |
| 2017/0108649 A1 | 4/2017 | Dallessasse et al. |
| 2017/0139411 A1 | 5/2017 | Hartung et al. |
| 2017/0146639 A1 | 5/2017 | Carothers |
| 2017/0146641 A1 | 5/2017 | Walsh et al. |
| 2017/0153319 A1 | 6/2017 | Villeneuve et al. |
| 2017/0155225 A1 | 6/2017 | Villeneuve et al. |
| 2017/0184450 A1 | 6/2017 | Doylend et al. |
| 2017/0207600 A1 | 7/2017 | Klamkin et al. |
| 2017/0268866 A1 | 9/2017 | Berz |
| 2017/0269198 A1 | 9/2017 | Hall et al. |
| 2017/0269215 A1 | 9/2017 | Hall et al. |
| 2017/0299697 A1 | 10/2017 | Swanson |
| 2017/0307648 A1 | 10/2017 | Kotake et al. |
| 2017/0307736 A1 | 10/2017 | Donovan |
| 2017/0328988 A1 | 11/2017 | Magee et al. |
| 2017/0343652 A1 | 11/2017 | de Mersseman et al. |
| 2017/0343791 A1 | 11/2017 | Swanson |
| 2017/0350965 A1 | 12/2017 | Schmalenberg |
| 2017/0350983 A1 | 12/2017 | Hall et al. |
| 2017/0356983 A1 | 12/2017 | Jeong et al. |
| 2017/0371227 A1 | 12/2017 | Skirlo et al. |
| 2017/0372602 A1 | 12/2017 | Gilliland et al. |
| 2018/0003805 A1 | 1/2018 | Popovich et al. |
| 2018/0024232 A1 | 1/2018 | Gilliland et al. |
| 2018/0024246 A1 | 1/2018 | Jeong et al. |
| 2018/0031680 A1 | 2/2018 | Lee et al. |
| 2018/0039154 A1 | 2/2018 | Hashemi et al. |
| 2018/0050704 A1 | 2/2018 | Tascione et al. |
| 2018/0073932 A1 | 3/2018 | Minet et al. |
| 2018/0088211 A1 | 3/2018 | Gill et al. |
| 2018/0095284 A1 | 4/2018 | Welch et al. |
| 2018/0102442 A1 | 4/2018 | Wang et al. |
| 2018/0103431 A1 | 4/2018 | Suh et al. |
| 2018/0113216 A1 | 4/2018 | Kremer et al. |
| 2018/0120433 A1 | 5/2018 | Eichenholz et al. |
| 2018/0120436 A1 | 5/2018 | Smits |
| 2018/0136321 A1 | 5/2018 | Verghese et al. |
| 2018/0143322 A1 | 5/2018 | Rosenzweig et al. |
| 2018/0143374 A1 | 5/2018 | Coolbaugh et al. |
| 2018/0149752 A1 | 5/2018 | Tadano |
| 2018/0164408 A1 | 6/2018 | Hall et al. |
| 2018/0172918 A1 | 6/2018 | Lane et al. |
| 2018/0188371 A1 | 7/2018 | Bao et al. |
| 2018/0217471 A1 | 8/2018 | Lee et al. |
| 2018/0224547 A1 | 8/2018 | Crouch et al. |
| 2018/0231643 A1 | 8/2018 | Lee et al. |
| 2018/0269890 A1 | 9/2018 | Ojeda |
| 2018/0287343 A1 | 10/2018 | Morrison et al. |
| 2018/0306925 A1 | 10/2018 | Hosseini et al. |
| 2018/0329037 A1 | 11/2018 | Bozchalooi et al. |
| 2018/0331493 A1 | 11/2018 | Lin et al. |
| 2018/0348343 A1* | 12/2018 | Achour ............... H01Q 1/364 |
| 2018/0351317 A1 | 12/2018 | Vermeulen |
| 2018/0356344 A1 | 12/2018 | Yi |
| 2018/0356522 A1 | 12/2018 | Kikuchi et al. |
| 2018/0359033 A1 | 12/2018 | Xu et al. |
| 2018/0364334 A1 | 12/2018 | Xiang et al. |
| 2018/0364336 A1 | 12/2018 | Hosseini et al. |
| 2018/0372517 A1 | 12/2018 | Yao et al. |
| 2018/0372530 A1 | 12/2018 | Welle et al. |
| 2018/0372870 A1 | 12/2018 | Puglia |
| 2018/0375284 A1 | 12/2018 | Permogorov |
| 2019/0004151 A1 | 1/2019 | Abediasl et al. |
| 2019/0011558 A1 | 1/2019 | Crouch et al. |
| 2019/0011559 A1 | 1/2019 | Desai et al. |
| 2019/0018110 A1 | 1/2019 | Kremer et al. |
| 2019/0018121 A1 | 1/2019 | Sayyah et al. |
| 2019/0018139 A1 | 1/2019 | Sayyah et al. |
| 2019/0018140 A1 | 1/2019 | Sarkissian et al. |
| 2019/0018144 A1 | 1/2019 | Imaki et al. |
| 2019/0018197 A1 | 1/2019 | Boutami et al. |
| 2019/0025094 A1 | 1/2019 | Lewis et al. |
| 2019/0025426 A1 | 1/2019 | Satyan et al. |
| 2019/0025431 A1 | 1/2019 | Satyan et al. |
| 2019/0027897 A1 | 1/2019 | Wei et al. |
| 2019/0033453 A1 | 1/2019 | Crouch et al. |

(56) References Cited

U.S. PATENT DOCUMENTS

| | | |
|---|---|---|
| 2019/0049569 A1 | 2/2019 | Kim et al. |
| 2019/0064329 A1 | 2/2019 | Liu et al. |
| 2019/0064332 A1 | 2/2019 | Schmalenberg et al. |
| 2019/0064358 A1 | 2/2019 | Desai et al. |
| 2019/0072651 A1 | 3/2019 | Halmos et al. |
| 2019/0072672 A1 | 3/2019 | Yao |
| 2019/0086514 A1 | 3/2019 | Dussan et al. |
| 2019/0086518 A1 | 3/2019 | Halstig et al. |
| 2019/0086550 A1 | 3/2019 | Dussan et al. |
| 2019/0096259 A1 | 3/2019 | McQuillen et al. |
| 2019/0101647 A1 | 4/2019 | Feshali et al. |
| 2019/0107623 A1 | 4/2019 | Campbell et al. |
| 2019/0120939 A1 | 4/2019 | O'Keeffe |
| 2019/0146074 A1 | 5/2019 | Hjelmstad |
| 2019/0146087 A1 | 5/2019 | Mansur et al. |
| 2019/0146164 A1 | 5/2019 | Krichevsky |
| 2019/0154816 A1 | 5/2019 | Hughes et al. |
| 2019/0154832 A1 | 5/2019 | Maleki et al. |
| 2019/0154835 A1 | 5/2019 | Maleki et al. |
| 2019/0179012 A1 | 6/2019 | Heo |
| 2019/0187269 A1 | 6/2019 | Tong et al. |
| 2019/0204419 A1 | 7/2019 | Baba et al. |
| 2019/0204441 A1 | 7/2019 | Feneyrou et al. |
| 2019/0204443 A1 | 7/2019 | Yao et al. |
| 2019/0250253 A1 | 8/2019 | Hung et al. |
| 2019/0250396 A1 | 8/2019 | Blanche et al. |
| 2019/0257924 A1 | 8/2019 | Li et al. |
| 2019/0257927 A1 | 8/2019 | Yao |
| 2019/0266741 A1* | 8/2019 | Uehara .................... G06T 7/13 |
| 2019/0280453 A1 | 9/2019 | Gopinath et al. |
| 2019/0293794 A1 | 9/2019 | Zhang et al. |
| 2019/0302262 A1 | 10/2019 | Singer |
| 2019/0302268 A1 | 10/2019 | Singer et al. |
| 2019/0310372 A1 | 10/2019 | Crouch et al. |
| 2019/0310377 A1 | 10/2019 | Lodin et al. |
| 2019/0317195 A1 | 10/2019 | Sun et al. |
| 2019/0331797 A1 | 10/2019 | Singer et al. |
| 2019/0339388 A1 | 11/2019 | Crouch et al. |
| 2019/0339389 A1 | 11/2019 | Russo et al. |
| 2019/0341739 A1 | 11/2019 | Loh et al. |
| 2019/0346056 A1 | 11/2019 | Staiger et al. |
| 2019/0346568 A1 | 11/2019 | Feng et al. |
| 2019/0353787 A1 | 11/2019 | Petit |
| 2019/0353789 A1 | 11/2019 | Boloorian et al. |
| 2019/0353977 A1 | 11/2019 | Hung |
| 2019/0361122 A1 | 11/2019 | Crouch et al. |
| 2019/0369244 A1 | 12/2019 | Asghari et al. |
| 2019/0369251 A1 | 12/2019 | Feng et al. |
| 2019/0372307 A1 | 12/2019 | Morton |
| 2019/0383907 A1 | 12/2019 | Belsley et al. |
| 2019/0391242 A1 | 12/2019 | Asghari et al. |
| 2019/0391243 A1 | 12/2019 | Nicolaescu |
| 2020/0018857 A1 | 1/2020 | Feng et al. |
| 2020/0021082 A1 | 1/2020 | Rakuljic |
| 2020/0025898 A1 | 1/2020 | Ain-Kedem et al. |
| 2020/0025926 A1 | 1/2020 | Asghari et al. |
| 2020/0043176 A1 | 2/2020 | Maila et al. |
| 2020/0049799 A1 | 2/2020 | Ando et al. |
| 2020/0057143 A1 | 2/2020 | Asghari et al. |
| 2020/0064116 A1 | 2/2020 | Salvade et al. |
| 2020/0064477 A1 | 2/2020 | Komatsuzaki |
| 2020/0072978 A1 | 3/2020 | Boloorian et al. |
| 2020/0072979 A1 | 3/2020 | Boloorian et al. |
| 2020/0076152 A1 | 3/2020 | Eichenholz et al. |
| 2020/0088876 A1 | 3/2020 | Tanemura et al. |
| 2020/0103501 A1 | 4/2020 | Kotelnikov et al. |
| 2020/0104647 A1 | 4/2020 | Pirim |
| 2020/0110179 A1 | 4/2020 | Talty et al. |
| 2020/0116837 A1 | 4/2020 | Asghari et al. |
| 2020/0116842 A1 | 4/2020 | Asghari et al. |
| 2020/0142065 A1 | 5/2020 | Boloorian et al. |
| 2020/0142066 A1 | 5/2020 | Sandborn et al. |
| 2020/0142068 A1 | 5/2020 | Crouch et al. |
| 2020/0150241 A1 | 5/2020 | Byrnes et al. |
| 2020/0158830 A1* | 5/2020 | Asghari ............... G01S 7/484 |
| 2020/0158833 A1 | 5/2020 | Baba et al. |
| 2020/0158839 A1 | 5/2020 | Lin et al. |
| 2020/0166617 A1 | 5/2020 | Crouch et al. |
| 2020/0166647 A1 | 5/2020 | Crouch et al. |
| 2020/0174095 A1 | 6/2020 | Altintas et al. |
| 2020/0182973 A1 | 6/2020 | Luff et al. |
| 2020/0182978 A1 | 6/2020 | Maleki et al. |
| 2020/0200879 A1 | 6/2020 | Halstig et al. |
| 2020/0209366 A1 | 7/2020 | Maleki |
| 2020/0225332 A1 | 7/2020 | Wagner et al. |
| 2020/0241119 A1 | 7/2020 | Asghari et al. |
| 2020/0249324 A1 | 8/2020 | Steinberg et al. |
| 2020/0249350 A1 | 8/2020 | Schmalenberg |
| 2020/0256956 A1 | 8/2020 | Luff et al. |
| 2020/0278432 A1 | 9/2020 | Thorpe et al. |
| 2020/0284879 A1 | 9/2020 | Asghari et al. |
| 2020/0284883 A1 | 9/2020 | Ferreira et al. |
| 2020/0284913 A1 | 9/2020 | Amelot et al. |
| 2020/0292706 A1 | 9/2020 | Hexsel et al. |
| 2020/0300980 A1 | 9/2020 | Behzadi et al. |
| 2020/0300993 A1 | 9/2020 | Behzadi et al. |
| 2020/0301070 A1 | 9/2020 | Nagarajan |
| 2020/0309949 A1 | 10/2020 | Feng et al. |
| 2020/0309952 A1 | 10/2020 | Imaki et al. |
| 2020/0319409 A1 | 10/2020 | Su et al. |
| 2020/0326476 A1 | 10/2020 | Hiratani |
| 2020/0333441 A1 | 10/2020 | Diaz |
| 2020/0333443 A1 | 10/2020 | Boloorian et al. |
| 2020/0333533 A1 | 10/2020 | Rogers et al. |
| 2020/0363515 A1 | 11/2020 | Luff et al. |
| 2020/0379115 A1* | 12/2020 | Yang .................... G01S 17/931 |
| 2020/0400821 A1 | 12/2020 | Baker et al. |
| 2020/0400822 A1 | 12/2020 | Ando et al. |
| 2020/0408911 A1 | 12/2020 | Boloorian et al. |
| 2020/0408912 A1 | 12/2020 | Boloorian et al. |
| 2021/0010802 A1 | 1/2021 | Onohara et al. |
| 2021/0033732 A1 | 2/2021 | Boloorian et al. |
| 2021/0055388 A1 | 2/2021 | Feng et al. |
| 2021/0063541 A1 | 3/2021 | Zheng et al. |
| 2021/0063542 A1 | 3/2021 | Zheng et al. |
| 2021/0072385 A1 | 3/2021 | Sandborn et al. |
| 2021/0072389 A1 | 3/2021 | Boloorian et al. |
| 2021/0072445 A1 | 3/2021 | Kurokawa et al. |
| 2021/0096228 A1 | 4/2021 | Behzadi et al. |
| 2021/0109195 A1 | 4/2021 | Feng et al. |
| 2021/0116778 A1 | 4/2021 | Zhang et al. |
| 2021/0132232 A1 | 5/2021 | Asghari et al. |
| 2021/0141058 A1 | 5/2021 | Piggott et al. |
| 2021/0149056 A1 | 5/2021 | Luff et al. |
| 2021/0156999 A1 | 5/2021 | Nishino et al. |
| 2021/0159659 A1 | 5/2021 | Bandyopadhyay et al. |
| 2021/0159664 A1 | 5/2021 | Liu et al. |
| 2021/0165102 A1 | 6/2021 | Crouch et al. |
| 2021/0173058 A1 | 6/2021 | Viswanatha et al. |
| 2021/0181320 A1 | 6/2021 | Oza et al. |
| 2021/0190907 A1 | 6/2021 | Sahara |
| 2021/0190921 A1 | 6/2021 | Golikov et al. |
| 2021/0190925 A1 | 6/2021 | Asghari et al. |
| 2021/0199797 A1 | 7/2021 | Choi et al. |
| 2021/0239811 A1 | 8/2021 | Asghari et al. |
| 2021/0255324 A1 | 8/2021 | Dunn et al. |
| 2021/0278540 A1 | 9/2021 | Maayan et al. |
| 2021/0293923 A1 | 9/2021 | Arkind et al. |
| 2021/0318436 A1 | 10/2021 | Boloorian et al. |
| 2021/0325520 A1 | 10/2021 | Cai et al. |
| 2021/0333386 A1 | 10/2021 | Park et al. |
| 2021/0349196 A1 | 11/2021 | Wang et al. |
| 2021/0349216 A1 | 11/2021 | Behroozpour et al. |
| 2021/0356592 A1 | 11/2021 | Behroozpour |
| 2021/0373162 A1 | 12/2021 | Wu et al. |
| 2021/0389244 A1 | 12/2021 | Bowman et al. |
| 2021/0396879 A1 | 12/2021 | Sun et al. |
| 2021/0405194 A1 | 12/2021 | Tsuchida |
| 2022/0003842 A1 | 1/2022 | Wang et al. |
| 2022/0050187 A1 | 2/2022 | Yao |
| 2022/0065999 A1 | 3/2022 | Phare et al. |
| 2022/0075121 A1 | 3/2022 | Lowder et al. |
| 2022/0085567 A1 | 3/2022 | Lowder et al. |
| 2022/0099837 A1 | 3/2022 | Crouch et al. |

(56) References Cited

U.S. PATENT DOCUMENTS

| | | |
|---|---|---|
| 2022/0107411 A1 | 4/2022 | Koonath et al. |
| 2022/0113422 A1 | 4/2022 | Hillard et al. |
| 2022/0121080 A1 | 4/2022 | Yao |
| 2022/0179055 A1 | 6/2022 | Ferrara et al. |
| 2022/0187457 A1 | 6/2022 | Daami et al. |
| 2022/0187458 A1 | 6/2022 | Piggott et al. |
| 2022/0187463 A1 | 6/2022 | Maheshwari et al. |
| 2022/0196814 A1 | 6/2022 | Lin et al. |
| 2022/0206164 A1 | 6/2022 | Takada |
| 2022/0244360 A1 | 8/2022 | Phare et al. |
| 2022/0283389 A1 | 9/2022 | Yang et al. |
| 2022/0291361 A1 | 9/2022 | Asghari et al. |
| 2022/0308192 A1 | 9/2022 | John et al. |
| 2022/0334225 A1 | 10/2022 | Davydenko et al. |
| 2022/0342048 A1 | 10/2022 | Asghari et al. |
| 2022/0365214 A1 | 11/2022 | Sandborn et al. |
| 2022/0373667 A1 | 11/2022 | Khatana et al. |
| 2022/0373739 A1 | 11/2022 | Abril et al. |
| 2022/0404470 A1 | 12/2022 | Asghari et al. |
| 2022/0413100 A1 | 12/2022 | Jain |
| 2022/0413143 A1 | 12/2022 | Parsa et al. |
| 2023/0027271 A1 | 1/2023 | Jin et al. |
| 2023/0069201 A1 | 3/2023 | Asghari et al. |
| 2023/0104453 A1 | 4/2023 | Asghari et al. |
| 2023/0194952 A1 | 6/2023 | Muranaka et al. |
| 2023/0228878 A1 | 7/2023 | Asghari et al. |
| 2023/0258861 A1 | 8/2023 | Vercruysse et al. |
| 2023/0288566 A1 | 9/2023 | Nadkarni et al. |
| 2023/0296732 A1 | 9/2023 | Xiao |
| 2025/0085401 A1 | 3/2025 | Zhou et al. |
| 2025/0094380 A1 | 3/2025 | Mazed |

FOREIGN PATENT DOCUMENTS

| | | | |
|---|---|---|---|
| CN | 103874945 A | 6/2014 | |
| CN | 104459881 A | 3/2015 | |
| CN | 204479750 U | 7/2015 | |
| CN | 105589074 A | 5/2016 | |
| CN | 105680320 A | 6/2016 | |
| CN | 105917257 A | 8/2016 | |
| CN | 106154248 A | 11/2016 | |
| CN | 106410607 A | 2/2017 | |
| CN | 106773028 A | 5/2017 | |
| CN | 106842232 A | 6/2017 | |
| CN | 106959439 A | 7/2017 | |
| CN | 107144847 A | 9/2017 | |
| CN | 107305184 A | 10/2017 | |
| CN | 107367734 A | 11/2017 | |
| CN | 108139465 A | 6/2018 | |
| CN | 108291970 A | 7/2018 | |
| CN | 108603758 A | 9/2018 | |
| CN | 109642952 A | 4/2019 | |
| CN | 110036276 A | 7/2019 | |
| CN | 107192355 B | 8/2019 | |
| CN | 110161516 A | 8/2019 | |
| CN | 110187350 A | 8/2019 | |
| CN | 110412685 A | 11/2019 | |
| CN | 111338025 A | 6/2020 | |
| CN | 112241014 A | 1/2021 | |
| CN | 114419152 A | 4/2022 | |
| CN | 110764074 B * | 6/2022 | ............ G01S 7/4911 |
| DE | 10 2015 222061 A1 | 5/2017 | |
| DE | 10 2017 200795 A1 | 7/2018 | |
| DE | 10 2017 106 226 A1 | 9/2018 | |
| DE | 102019124598 A1 | 3/2020 | |
| EP | 0 523 921 A1 | 1/1993 | |
| EP | 2796890 A1 | 10/2014 | |
| EP | 2955542 B1 | 4/2017 | |
| EP | 3339924 A1 | 6/2018 | |
| EP | 3259615 B1 | 11/2019 | |
| EP | 3719537 A1 | 10/2020 | |
| EP | 3 584 893 B1 | 6/2021 | |
| EP | 3889644 A1 | 10/2021 | |
| GB | 1 585 053 A | 2/1981 | |
| GB | 2173664 A | 10/1986 | |
| GB | 2586499 A | 2/2021 | |
| JP | H1010227 A | 1/1998 | |
| JP | 2003224321 A | 8/2003 | |
| JP | 2004-151022 A | 5/2004 | |
| JP | 2007184511 A | 7/2007 | |
| JP | 2008160130 A | 7/2008 | |
| JP | 2008292370 A | 12/2008 | |
| JP | 2009-115696 A | 5/2009 | |
| JP | 2010151806 A | 7/2010 | |
| JP | 2010271624 A | 12/2010 | |
| JP | 2012146787 A | 8/2012 | |
| JP | 2013165407 A | 8/2013 | |
| JP | 2014202716 A | 10/2014 | |
| JP | 2015-018640 A | 1/2015 | |
| JP | 2015092184 A | 5/2015 | |
| JP | 2015172540 A | 10/2015 | |
| JP | 2015180735 A | 10/2015 | |
| JP | 2015230259 A | 12/2015 | |
| JP | 2016111087 A | 6/2016 | |
| JP | 2016-525209 A | 8/2016 | |
| JP | 2017502315 A | 1/2017 | |
| JP | 2017097340 A | 6/2017 | |
| JP | 2017106897 A | 6/2017 | |
| JP | 2017524918 A | 8/2017 | |
| JP | 2017161484 A | 9/2017 | |
| JP | 2017-198514 A | 11/2017 | |
| JP | 2017-211348 A | 11/2017 | |
| JP | 2018511054 A | 4/2018 | |
| JP | 2018-512600 A | 5/2018 | |
| JP | 2018520346 A | 7/2018 | |
| JP | 2018529955 A | 10/2018 | |
| JP | 2018188284 A | 11/2018 | |
| JP | 2018200273 A | 12/2018 | |
| JP | 2019502925 A | 1/2019 | |
| JP | 2019095218 A | 6/2019 | |
| JP | 2019525195 A | 9/2019 | |
| JP | 2019-537012 A | 12/2019 | |
| JP | 2020-16639 A | 1/2020 | |
| JP | 2020-34546 A | 3/2020 | |
| JP | 2002090457 A | 3/2020 | |
| JP | 2020085723 A | 6/2020 | |
| JP | 2021004800 A | 1/2021 | |
| JP | 2021032848 A | 3/2021 | |
| KR | 20060086182 A | 7/2006 | |
| KR | 10-2015-0045735 A | 4/2015 | |
| KR | 20180013598 A | 2/2018 | |
| KR | 101 931 022 B1 | 12/2018 | |
| WO | 97/11396 A1 | 3/1997 | |
| WO | 2010123182 A1 | 10/2010 | |
| WO | 2012123668 A1 | 9/2012 | |
| WO | 2012153309 A2 | 11/2012 | |
| WO | 2013/049579 A1 | 4/2013 | |
| WO | 2014/203654 A1 | 12/2014 | |
| WO | 2014/206630 A1 | 12/2014 | |
| WO | 2015/044370 A1 | 4/2015 | |
| WO | 2015/058209 A1 | 4/2015 | |
| WO | 2015/098027 A1 | 7/2015 | |
| WO | 2015/200800 A1 | 12/2015 | |
| WO | 2016/097409 A2 | 6/2016 | |
| WO | 2017/023107 A1 | 2/2017 | |
| WO | 2017/083597 A1 | 5/2017 | |
| WO | 2017/095817 A1 | 6/2017 | |
| WO | 2017/102156 A1 | 6/2017 | |
| WO | 2017/187510 A1 | 11/2017 | |
| WO | 2017/216581 A1 | 12/2017 | |
| WO | 2018/003852 A1 | 1/2018 | |
| WO | 2018/036946 A1 | 3/2018 | |
| WO | 2018/060318 A1 | 4/2018 | |
| WO | 2018/116412 A1 | 6/2018 | |
| WO | 2018/160240 A2 | 9/2018 | |
| WO | 2018/230474 A1 | 12/2018 | |
| WO | 2019/010320 A1 | 1/2019 | |
| WO | 2019/018894 A1 | 1/2019 | |
| WO | 2019/121069 A1 | 6/2019 | |
| WO | 2019/130472 A1 | 7/2019 | |
| WO | 2019/149815 A1 | 8/2019 | |
| WO | 2019/196135 A1 | 10/2019 | |
| WO | 2019/217761 A1 | 11/2019 | |
| WO | 2019/217857 A1 | 11/2019 | |

(56) References Cited

FOREIGN PATENT DOCUMENTS

| | | |
|---|---|---|
| WO | 2019/236430 A1 | 12/2019 |
| WO | 2020/005537 A1 | 1/2020 |
| WO | 2020/033161 A1 | 2/2020 |
| WO | 2020/046513 A1 | 3/2020 |
| WO | 2020/076566 A1 | 4/2020 |
| WO | 2020/110779 A1 | 6/2020 |
| WO | 2020/129284 A1 | 6/2020 |
| WO | 2020/234797 A1 | 11/2020 |
| WO | 2020/251633 A1 | 12/2020 |
| WO | 2021/024038 A1 | 2/2021 |
| WO | 2021/252894 A1 | 12/2021 |
| WO | 2022/013422 A1 | 1/2022 |
| WO | 2022/233503 A1 | 11/2022 |
| WO | 2023/006470 A1 | 2/2023 |
| WO | 2023/118295 A1 | 6/2023 |

OTHER PUBLICATIONS

Anderson et al., "ladar: Frequency-Modulated Continuous Wave Laser Detection AND Ranging", Photogrammetric Engineering & Remote Sensing, vol. 83, No. 11, Nov. 2017.

Baghmisheh, B. B., "Chip-scale Lidar", Jan. 19, 2017, Electrical Engineering and Computer Sciences University of California, Berkeley.

Behroozpour et al., "Electronic-Photonic Integrated Circulator 3D Microimaging", IEEE Journal of Solid-State Circuits, Jan. 2017, vol. 52, No. 1, pp. 161-172.

Behroozpour, B. et al., "Lidar System Architectures and Circuits," IEEE Communications Magazine, Oct. 2017, pp. 135-142.

Carter et al., "Lidar 101: An Introduction to Lidar Technology, Data, and Applications", Nov. 2012, NOAA Coastal Services Center, 76 pages.

Chan, M.K, "Atmospheric transmission windows for high energy short pulse lasers", Thesis, Naval Postgraduate School, Dec. 2003.

Conditional Euclidean Clustering, retrieved on Jul. 9, 2022 from https://pcl.readthedocs.io/projects/tutorials/en/latest/cluster_extraction.html#cluster-extraction.

Cooksey, Catherine C. et al., "Reflectance measurements of human skin from the ultraviolet to the shortwave infrared (250 nm to 2500 nm)", May 23, 2013, SPIE Defense, Security, and Sensing Conference Proceedings Apr. 29-May 3, 2013, Baltimore, Maryland, vol. 8734, Active and Passive Signatures, 9 pages.

Day, I.E., et al. "Solid state absorption attenuator in silicon-on-insulator with MHz bandwidth.", Integrated Photonics Research 2002, Vancouver, Canada, Jul. 17-19, 2002 (Optica Publishing Group, 2002), paper IFA5, 3 pages.

Doylend, J. K., "Two-dimensional free-space beam steering with an optical phased array on silicon-on-insulator", Oct. 1, 2011, Optics Express, 19(22), 21595-2160.

Euclidean Cluster Extraction, retrieved on Jul. 9, 2022 from https://pcl.readthedocs.io/projects/tutorials/en/latest/conditional_euclidean_clustering.html.

Gao, S. and Hui, R., "4. Frequency-modulated continuous-wave lidar using I/Q modulator for simplified heterodyne detection", Optics Letter, vol. 37, No. 11, Jun. 1, 2012, pp. 2022-2024.

Gemfire Corporation, "8-Channel Cyclic (Colorless) Arrayed Waveguide Grating (AWG)", (2018). Retrieved from AMS Technologies: http://www.amstechnologies.com/products/optical-technologies/components/fiberoptics/multiplexers/awg-multiplexers/view/8-channel-cyclic-arrayed-waveguide-grating-awg/.

Goodman, J., "Speckle Phenomena in Optics Theory and Applications", Roberts and Company, Sep. 28, 2007, 130(2), pp. 413-414.

Gulati, et al., "A Low-Power Reconfigurable Analog-to-Digital Converter", IEEE Journal of Solid-State Circuits, Dec. 2001, vol. 36, No. 12, pp. 1900-1911.

Guo et al., "Beat-frequency adjustable Er3+-doped DBR fiber laser for ultrasound detection", Optics Express, Jan. 31, 2011, vol. 19, No. 3, pp. 2485-2492.

Haran, T., "Short-wave infrared diffuse reflectance of Textile Materials", Thesis, Georgia State University, 2008.

Heck et al., "Hybrid Silicon Photonic Integrated Circuit Technology", IEEE Journal of Selected Topics in Quantum Electronics, IEEE, USA, vol. 19, No. 4, Jul. 1, 2013, p. 6100117, 17 pages.

Hsu et al., "Free-Space Applications of Silicon Photonics: A Review, Micromachines 2022", 13, 990, Jun. 24, 2022 [Retrieved from: <URL: https://mdpi.com/2072-66X/13/7/990>.

Issakov, V. "Radar Systems, Ch. 2. In Microwave Circuits for 24GHz Automotive Radar in Silicon-based Technologies", Jan. 1, 2010, Berlin Heidelberg: Springer-Verlag, pp. 5-18.

Kaasalainen, S., "The multispectral journey of Lidar", Retrieved from GIM International: https://www.gim-international.com/content/article/the-multispectral-journey-of-lidar, Jan. 24, 2019.

Kelly et al., "Discrete mode laser diodes with ultra narrow linewidthe emission" Feb. 2007, Electronics Letters, vol. 43, 2 pgs.

Klumperink, Eric A.M. et al., "N-path filters and Mixer-First Receivers: A review", 2017 IEEE Custom Integrated Circuits Conference (CICC), Austin, TX, USA, Apr. 30, 2017, pp. 1-8.

Komljenovic et al., "Widely-Tunable Ring-Resonator Semiconductor Lasers", Review, Jul. 17, 2017, 21 pages.

Kotthaus, S., et al., "Derivation of an urban materials spectral library through emittance and reflectance spectroscopy", ISPRS Journal of Photogrammetry and Remote Sensing, Aug. 2014, vol. 94, 194-212.

Kumar et al., "Intra-data center interconnects, networking, and architectures", Coherent Detection, Optical Fiber Telecommunications VII, Oct. 25, 2019, Science Direct, pp. 627-672.

Li, L., "Time-of-Flight Camera—An Introduction", 2014, TI Technical White Paper, SLOA190B.

Li et al., "Photon-Counting Chirped Amplitude Modulation Lidar with 1.5-GHz Gated InGaAs/InP APD", IEEE Photonics Technology Letters, Mar. 15, 2015, vol. 27, No. 6, pp. 616-719.

Lu, Z., "Silicon Photonic Switches for Optical Communication Applications", PhD Thesis. University of British Columbia, Sep. 29, 2017, 165 pages.

PDB450C—Switchable Gain Balanced Amp. Photodetector, InGaAs. (n.d.). Retrieved from Thorlabs: https://www.thorlabs.com/thorproduct.cfm?partnumber=PDB450C.

Pfennigbauer, M. et al., "Multi-Wavelength Airborne Laser Scanning", ILMF 2011. New Orleans, Feb. 7-9, 2011.

PI Motion/Positioning, 2018, Retrieved from PI USA: http://www.pi-usa.us/products/PDF_Data/Q-522_Mini_Positioning_Stage_20150203.pdf.

PI USA: Fast Tip/Tilt Platform, 2018, Retrieved from PI USA Active Optics: http://www.pi-usa.us/products/PDF_Data/S335_Fast_Tip-Tilt_Platform.pdf.

Pierrottet et al., "Linear FMCW Laser Radar for Precision Range and Vector Velocity Measurements", MRS Online Proceeding Library Archive, Jan. 2008, pp. 1-9.

Pilot Photonics, Lyra OCS 1000, Optical comb laser module, Retrieved on Nov. 20, 2019 from Pilot Photonics: http://www.pilotphotonics.com/optical-frequency-comb-source/.

Poulton, C. V. MSC Thesis, "Integrated LIDAR with Optical Phased Arrays in Silicon Photonics", Massachusetts Institute of Technology, Sep. 2016, pp. 95-101.

Poulton, Christopher V. et al., "Coherent Solid-State LIDAR with Silicon Photonic Optical Phased Arrays", pp. 4091-4094, Oct. 15, 2017, Optics Letters, vol. 42, No. 20.

Rablau, "LIDAR—A new (self-driving) vehicle for introducing optics to broader engineering and non-engineering audiences", in Fifteenth Conference on Education and Training in Optics and Photonics 2019, May 21-24, 2019, Quebec City, Quebec, Optica Publishing Group 2019, Paper 11143_138 (14 pages).

Royo et al., "An Overview of LIDAR Imaging Systems for Autonomous Vehicles", Appl. Sci., Sep. 30, 2019, 9(19):4093, 37 pages. https://doi.org/10.3390/app9194093.

Rusu, Radu Bogdan Dissertation, Semantic 3D Object Maps for Everyday Manipulation in Human Living Environments, retrieved on Jul. 9, 2022 from http://mediatum.ub.tum.de/doc/800632/941254.pdf.

(56) References Cited

OTHER PUBLICATIONS

Sandborn, Phillip Alan McGinnis, "FMCW Lidar: Scaling to the Chip-Level and Improving Phase-Noise-Limited Performance", Fall 2017, 18 pages.

Satyan, N. et al., "Precise control of broadband frequency chirps using optoelectronic feedback," Optics Express, Aug. 31, 2009, vol. 17, No. 18, pp. 15991-15999.

Schulmeister, Karl, "White Paper The new edition of the international laser product safety standard", IEC 60825-1, 2014.

Self, "Focusing of spherical Gaussian beams", Applied Optics, Mar. 1, 1983, vol. 22, No. 5, pp. 658-661.

Singh, Jaswant, "Spectral Reflectance of Land Covers", Retrieved from Department of Geology, Aligharh Muslim University: http://www.geol-amu.org/notes/m1r-1-8.htm, Aug. 15, 2016, 11 pages.

Smit, Meint K. C. v., "Phasar-Based WDM-Devices: Principles, Design and Applications", IEEE Journal of Selected Topics in Quantum Electronics, Jan. 1, 1996, 2(2), 236-250.

Soref, Richard A. et al. "Electrooptical Effects in Silicon", IEEE Journal of Quantum Electronics, vol. QE-23, No. 1, Jan. 1987, pp. 123-129.

Stephens et al., "Demonstration of an Interferometric Laser Ranging System for a Follow-On Gravity Mission to Grace", IEEE International Symposium on Geoscience and Remote Sensing, Jul. 31, 2006 to Aug. 4, 2006, pp. 1115-1118.

Sun, J., et al., "Large-scale silicon photonic circuits for optical phased arrays," vol. 20, No. 4, Jul./Aug. 2014. IEEE Journal of Selected Topics in Quantum Electronics.

"The Demultiplexer" accessed from www.electronics-tutorials.ws/combination/comb_3.html with WayBack Machine dated Feb. 9, 2008, 2 pages.

Van Acoleyen et al., "Off-chip beam steering with a one-dimensional optical phased array on silicon-on-insulator", Apr. 2009, Opt. Lett., 34(9) 1477-1479.

Van Acoleyen et al., "Two-Dimensional Dispersive Off-Chip Beam Scanner Fabricated on Silicon-On-Insulator", Jun. 16, 2011, IEEE Photon. Technol. Lett., 23(17), 1270-1272.

Vasilyev, A. et al., "The Optoelectronic Swept-Frequency Laser and Its Applications in Ranging, Three-Dimensional Imaging, and Coherent Beam Combining of Chirped-Seed Amplifiers," CaltechTHESIS, May 20, 2013, 177 pages.

Velodyne, "HDL-64E S2 Datasheet. Retrieved from http://velodynelidar.com/lidar/products/brochure/HDL-64E%20S2%20datasheet_2010_lowres.pdf", 2017.

Wang et al., "Automotive FMCW Radar-enhanced Range Estimation via a Local Resampling Fourier Transform", International Journal of Advanced Robotic Systems, May 15, 2016, pp. 1-8.

Wikipedia, Optical Attenuator, 2022, 3 pages.

Wojtanowski, J. et al., "Comparison of 905 nm and 1550 nm semiconductor laser rangefinders' performance deterioration due to adverse environmental conditions", Opto-Electronics Review, 22(3), 183-190, Jun. 13, 2014.

Wojtkiewicz et al., "Two-dimensional signal processing in FMCW radars", National Conference on Circuit Theory and Electronic Networks, vol. 2, Oct. 1997, pp. 1-6.

Zhu et al., "Dual-Comb Ranging", Engineering, 4, Oct. 16, 2018, pp. 772-778.

\* cited by examiner

DATA REFINEMENT IN OPTICAL SYSTEMS

FIELD

The invention relates to imaging systems. In particular, the invention relates to data refinement in imaging systems.

BACKGROUND

LIDAR systems output a system output signal that is reflected by objects located outside of the LIDAR system. The reflected light returns to the LIDAR system as a system return signal. The LIDAR system includes electronics that use the system return signal to determine LIDAR data (radial velocity and/or distance between the LIDAR system and the objects) for a sample region that is illuminated by the system output signal.

In order for a LIDAR system to generate an image of a scene, the system output signal is scanned across the scene. During the scan, the LIDAR data is generated for multiple different sample regions within the scene. Each of the sample regions is illuminated for a regional time period in order to generate the LIDAR data for the sample region. However, the scanning of the system output signal continues during the regional time period. As a result, the system output signal can illuminate one object at the start of a regional time period and then move so the system output signal illuminates another object before the regional time period has expired. Changing the object that is illuminated during a regional time period is a source of errors in the LIDAR data. As a result, there is a need for LIDAR systems that can provide more reliable LIDAR data.

SUMMARY

A LIDAR system is configured to output a system output signal such that a frequency of the system output signal changes in a series of repeated cycles. Each of the cycles includes multiple data periods. The frequency of the system output signal changes at different rates during different data periods. The LIDAR system includes a light-combining component that combines light that returns to the LIDAR system from the system output signal with light from a reference signal so as to generate a beating signal beating at a beat frequency. The reference signal carries light that has not been transmitted from the LIDAR system. The system includes electronics that generate frequency change data that indicates a beat frequency change over time. The beat frequency change is a change in the beat frequency between different data periods. The electronics can apply edge detection criteria to the frequency change data so as to identify data periods where the system output signal illuminated an edge of a surface and/or can apply edge detection criteria to the frequency change data so as to identify data periods where the beat frequency is an outlier.

A method of operating a LIDAR system includes transmitting a system output signal from the LIDAR system such that a frequency of the system output signal changes in a series of repeated cycles. Each of the cycles includes multiple data periods. The frequency of the system output signal changes at a different rate during different data periods. The method includes combining light that returns to the LIDAR system from the system output signal with light from a reference signal so as to generate a beating signal beating at a beat frequency. The reference signal includes light that has not exited from the LIDAR system. The method also includes generating frequency change data that indicates a beat frequency change over time. The beat frequency change is the change in the beat frequency between different data periods. The method further includes calculating the LIDAR data such that the LIDAR data is a function of the frequency change data.

DESCRIPTION

Figure 1A:
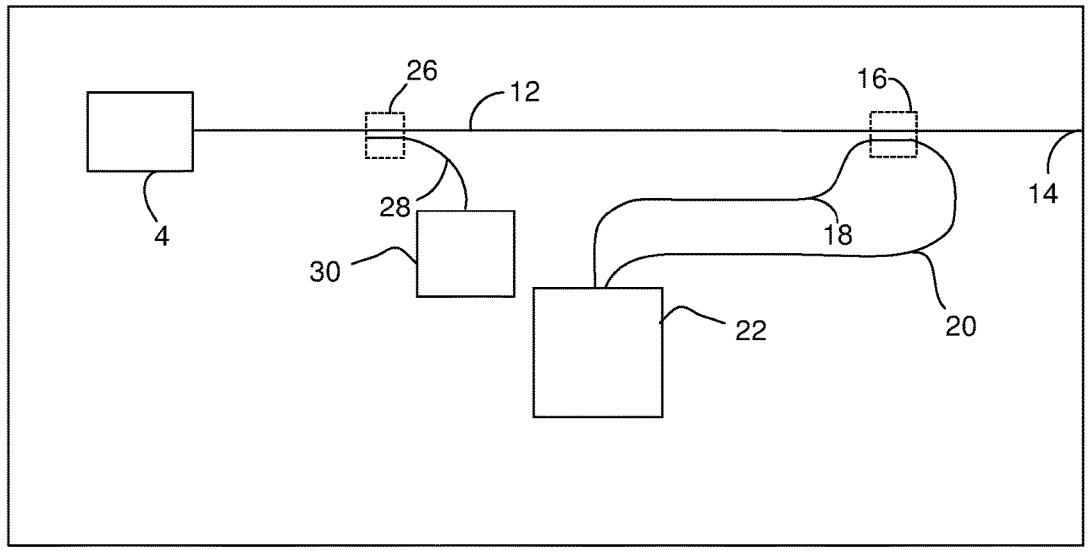
FIG. 1A is a topview of a schematic of a LIDAR system that includes or consists of a LIDAR chip that outputs a LIDAR output signal and receives a LIDAR input signal on a common waveguide.
Figure 1A:
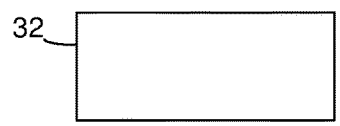

A LIDAR system is configured to perform a field scan where multiple sample regions in a field of view are sequentially illuminated by a system output signal. When an object is present in the field of view, the object can reflect light from the system output signal. The reflected light can return to the LIDAR system as a system return signal. The LIDAR system includes electronics that use light from the system return signal to generate LIDAR data results for the sample regions. Each of the LIDAR data results indicates a radial velocity and/or a separation distance between the LIDAR system and an object located outside of the LIDAR system and in the sample region illuminated by the system output signal that is associated with the LIDAR data.

The LIDAR system includes a light combining component that combines light from the system return signal with light that has not exited from the LIDAR system so as to generate a beating signal.

During the field scan, the frequency of the system output signal changes in a series of repeated cycles. Each of the cycles includes multiple data periods. During different data periods, the frequency of the system output signal is changed at a different rate. The electronics can generate beat frequency change data that indicates the level of beat frequency change that occurs between different data periods (frequency change values). It has been found the beat frequency change data shows patterns that can be used to identify data periods where the system output signal illuminates the edge of a surface. As a result, the LIDAR system can include electronics configured to identify data periods where the system output signal illuminates the edge of a surface.

Inaccuracies in LIDAR data can be caused by edge effect errors that occur when a system output signal illuminates an edge of a surface during a data period. The ability of the electronics to identify the locations of edges in the field of view allows the electronics to correct for present of these edges before the LIDAR data is generated. As a result, the LIDAR system can generate LIDAR data with an increased level of reliability.

Additionally, it has been found that the beat frequency change data shows patterns that can be used to identify outliers in the beat frequencies. Outliers are beat frequencies that are not consistent with the surrounding data points and can be caused by sources such as system noise and target irregularities as well as other sources. The electronics can use the patterns in the frequency change data to identify these outliers and to adjust the LIDAR data for the presence of outliers. As a result, the influence of these outliers can be removed from the generation of the LIDAR data to further increase the reliability of the LIDAR data.

The identification of the LIDAR data results with edge error effects can be done with LIDAR data results from as few as four data periods. Since very few data periods are needed to identify the presence of edges, the process of identifying LIDAR data with edge error effects and/or correcting LIDAR data with edge error effects can be done "on the fly." For instance, the correcting LIDAR data for edge error effects can be a process that trails the generation of LIDAR data. Prior efforts to correct LIDAR data for edge effect errors have been complex algorithms that required LIDAR data from the LIDAR system's full field of view. The ability of the currently disclosed LIDAR system to correct the LIDAR data "on the fly" eliminates the time delays associated with the prior efforts to correct edge effect errors. As a result, the LIDAR system is highly suitable for use in applications that require rapid generation of reliable LIDAR data results such as advanced drive assistance systems (ADAS) and autonomous vehicles (AVs).

FIG. 1A is a topview of a schematic of a LIDAR chip that can serve as a LIDAR system or can be included in a LIDAR system that includes components in addition to the LIDAR chip. The LIDAR chip can include a Photonic Integrated Circuit (PIC) and can be a Photonic Integrated Circuit chip. The LIDAR chip includes a light source 4 that outputs a preliminary outgoing LIDAR signal. A suitable light source 4 includes, but is not limited to, semiconductor lasers such as External Cavity Lasers (ECLs), Distributed Feedback lasers (DFBs), Discrete Mode (DM) lasers and Distributed Bragg Reflector lasers (DBRs).

The LIDAR chip includes a utility waveguide 12 that receives an outgoing LIDAR signal from a light source 4. The utility waveguide 12 terminates at a facet 14 and carries the outgoing LIDAR signal to the facet 14. The facet 14 can be positioned such that the outgoing LIDAR signal traveling through the facet 14 exits the LIDAR chip and serves as a LIDAR output signal. For instance, the facet 14 can be positioned at an edge of the chip so the outgoing LIDAR signal traveling through the facet 14 exits the chip and serves as the LIDAR output signal. In some instances, the portion of the LIDAR output signal that has exited from the LIDAR chip can also be considered a system output signal. As an example, when the exit of the LIDAR output signal from the LIDAR chip is also an exit of the LIDAR output signal from the LIDAR system, the LIDAR output signal can also be considered a system output signal.

The LIDAR output signal travels away from the LIDAR system through free space in the atmosphere in which the LIDAR system is positioned. The LIDAR output signal may be reflected by one or more objects in the path of the LIDAR output signal. When the LIDAR output signal is reflected, at least a portion of the reflected light travels back toward the LIDAR chip as a LIDAR input signal. In some instances, the LIDAR input signal can also be considered a system return signal. As an example, when the exit of the LIDAR output signal from the LIDAR chip is also an exit of the LIDAR output signal from the LIDAR system, the LIDAR input signal can also be considered a system return signal.

The LIDAR input signals can enter the utility waveguide 12 through the facet 14. The portion of the LIDAR input signal that enters the utility waveguide 12 serves as an incoming LIDAR signal. The utility waveguide 12 carries the incoming LIDAR signal to a splitter 16 that moves a portion of the outgoing LIDAR signal from the utility waveguide 12 onto a comparative waveguide 18 as a comparative signal. The comparative waveguide 18 carries the comparative signal to a processing component 22 for further processing. Although FIG. 1A illustrates a directional coupler operating as the splitter 16, other signal tapping components can be used as the splitter 16. Suitable splitters 16 include, but are not limited to, directional couplers, optical couplers, y-junctions, tapered couplers, and Multi-Mode Interference (MMI) devices.

The utility waveguide 12 also carrier the outgoing LIDAR signal to the splitter 16. The splitter 16 moves a portion of the outgoing LIDAR signal from the utility waveguide 12 onto a reference waveguide 20 as a reference signal. The reference waveguide 20 carries the reference signal to the processing component 22 for further processing.

The percentage of light transferred from the utility waveguide 12 by the splitter 16 can be fixed or substantially fixed. For instance, the splitter 16 can be configured such that the power of the reference signal transferred to the reference waveguide 20 is an outgoing percentage of the power of the outgoing LIDAR signal or such that the power of the comparative signal transferred to the comparative waveguide 18 is an incoming percentage of the power of the incoming LIDAR signal. In many splitters 16, such as directional couplers and multimode interferometers (MMIs), the outgoing percentage is equal or substantially equal to the incoming percentage. In some instances, the outgoing percentage is greater than 30%, 40%, or 49% and/or less than 51%, 60%, or 70% and/or the incoming percentage is greater than 30%, 40%, or 49% and/or less than 51%, 60%, or 70%. A splitter 16 such as a multimode interferometer (MMI) generally provides an outgoing percentage and an incoming percentage of 50% or about 50%. However, multimode interferometers (MMIs) can be easier to fabricate in platforms such as silicon-on-insulator platforms than some alternatives. In one example, the splitter 16 is a multimode interferometer (MMI) and the outgoing percentage and the incoming percentage are 50% or substantially 50%. As will be described in more detail below, the processing component 22 combines the comparative signal with the reference signal to form a composite signal that carries LIDAR data for a sample region on the field of view. Accordingly, the composite signal can be processed so as to extract LIDAR data (radial velocity and/or distance between a LIDAR system and an object external to the LIDAR system) for the sample region.

The LIDAR chip can include a control branch for controlling operation of the light source 4. The control branch includes a splitter 26 that moves a portion of the outgoing LIDAR signal from the utility waveguide 12 onto a control waveguide 28. The coupled portion of the outgoing LIDAR signal serves as a tapped signal. Although FIG. 1A illustrates a directional coupler operating as the splitter 26, other signal tapping components can be used as the splitter 26. Suitable splitters 26 include, but are not limited to, directional couplers, optical couplers, y-junctions, tapered couplers, and Multi-Mode Interference (MIMI) devices.

The control waveguide 28 carries the tapped signal to control components 30. The control components can be in electrical communication with electronics 32. All or a portion of the control components can be included in the electronics 32. During operation, the electronics can employ output from the control components 30 in a control loop configured to control a process variable of one, two, or three loop controlled light signals selected from the group consisting of the tapped signal, the system output signal, and the outgoing LIDAR signal. Examples of the suitable process variables include the frequency of the loop controlled light signal and/or the phase of the loop controlled light signal.

Figure 1B:
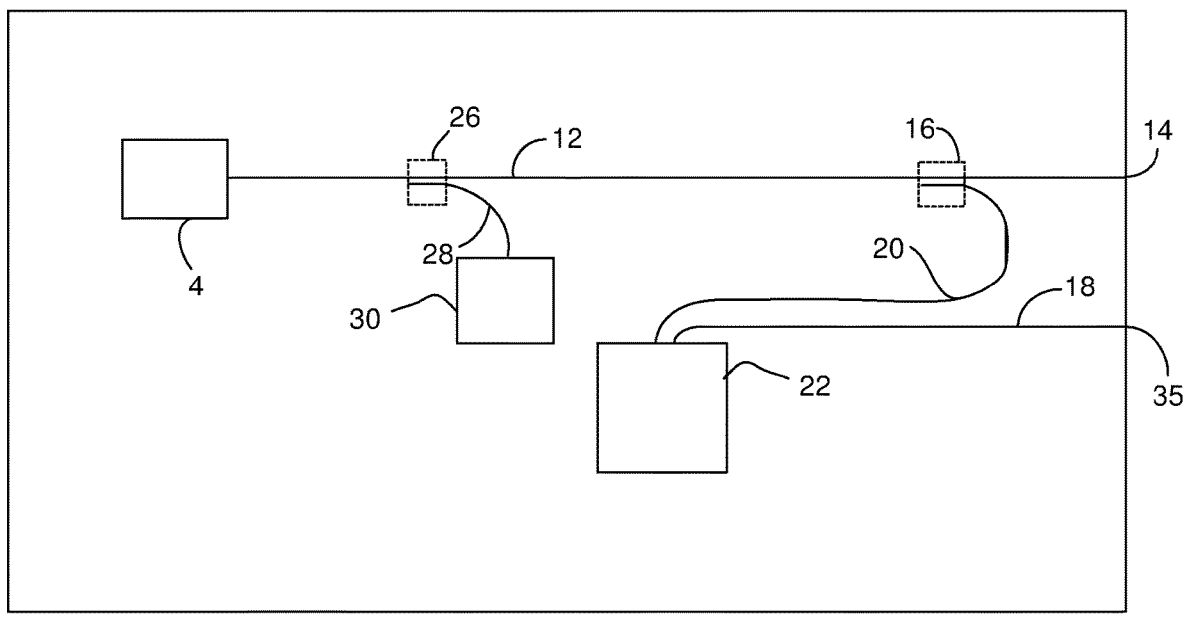
FIG. 1B is a topview of a schematic of a LIDAR system that includes or consists of a LIDAR chip that outputs a LIDAR output signal and receives a LIDAR input signal on different waveguides.
Figure 1B:
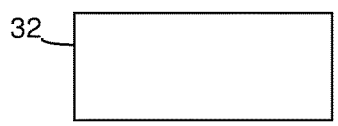

The LIDAR system can be modified so the incoming LIDAR signal and the outgoing LIDAR signal can be carried on different waveguides. For instance, FIG. 1B is a topview of the LIDAR chip of FIG. 1A modified such that the incoming LIDAR signal and the outgoing LIDAR signal are carried on different waveguides. The outgoing LIDAR signal exits the LIDAR chip through the facet 14 and serves as the LIDAR output signal. When light from the LIDAR output signal is reflected by an object external to the LIDAR system, at least a portion of the reflected light returns to the LIDAR chip as a first LIDAR input signal. The first LIDAR input signals enters the comparative waveguide 18 through a facet 35 and serves as the comparative signal. The comparative waveguide 18 carries the comparative signal to a processing component 22 for further processing. As described in the context of FIG. 1A, the reference waveguide 20 carries the reference signal to the processing component 22 for further processing. As will be described in more detail below, the processing component 22 combines the comparative signal with the reference signal to form a composite signal that carries LIDAR data for a sample region on the field of view.

Figure 1C:
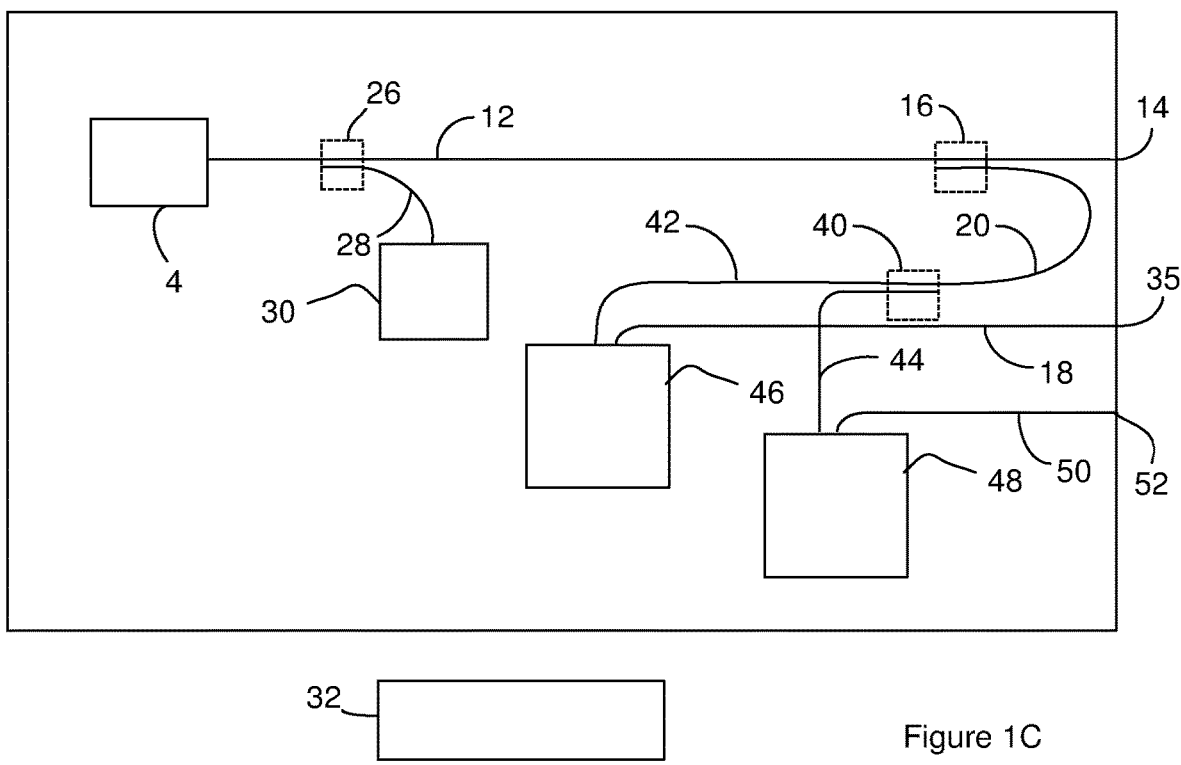
FIG. 1C is a topview of a schematic of another embodiment of a LIDAR system that that includes or consists of a LIDAR chip that outputs a LIDAR output signal and receives multiple LIDAR input signals on different waveguides.

The LIDAR chips can be modified to receive multiple LIDAR input signals. For instance, FIG. 1C illustrates the LIDAR chip of FIG. 1B modified to receive two LIDAR input signals. A splitter 40 is configured to place a portion of the reference signal carried on the reference waveguide 20 on a first reference waveguide 42 and another portion of the reference signal on a second reference waveguide 44. Accordingly, the first reference waveguide 42 carries a first reference signal and the second reference waveguide 44 carries a second reference signal. The first reference waveguide 42 carries the first reference signal to a first processing component 46 and the second reference waveguide 44 carries the second reference signal to a second processing component 48. Examples of suitable splitters 40 include, but are not limited to, y-junctions, optical couplers, and multimode interference couplers (MMIs).

The outgoing LIDAR signal exits the LIDAR chip through the facet 14 and serves as the LIDAR output signal. When light from the LIDAR output signal is reflected by one or more object located external to the LIDAR system, at least a portion of the reflected light returns to the LIDAR chip as a first LIDAR input signal. The first LIDAR input signals enters the comparative waveguide 18 through the facet 35 and serves as a first comparative signal. The comparative waveguide 18 carries the first comparative signal to a first processing component 46 for further processing.

Additionally, when light from the LIDAR output signal is reflected by one or more object located external to the LIDAR system, at least a portion of the reflected signal returns to the LIDAR chip as a second LIDAR input signal. The second LIDAR input signals enters a second comparative waveguide 50 through a facet 52 and serves as a second comparative signal carried by the second comparative waveguide 50. The second comparative waveguide 50 carries the second comparative signal to a second processing component 48 for further processing.

Although the light source 4 is shown as being positioned on the LIDAR chip, the light source 4 can be located off the LIDAR chip. For instance, the utility waveguide 12 can terminate at a second facet through which the outgoing LIDAR signal can enter the utility waveguide 12 from a light source 4 located off the LIDAR chip.

In some instances, a LIDAR chip constructed according to FIG. 1B or FIG. 1C is used in conjunction with a LIDAR adapter. In some instances, the LIDAR adapter can be physically optically positioned between the LIDAR chip and the one or more reflecting objects and/or the field of view in that an optical path that the first LIDAR input signal(s) and/or the LIDAR output signal travels from the LIDAR chip to the field of view passes through the LIDAR adapter. Additionally, the LIDAR adapter can be configured to operate on the first LIDAR input signal and the LIDAR output signal such that the first LIDAR input signal and the LIDAR output signal travel on different optical pathways between the LIDAR adapter and the LIDAR chip but on the same optical pathway between the LIDAR adapter and a reflecting object in the field of view.

Figure 2:
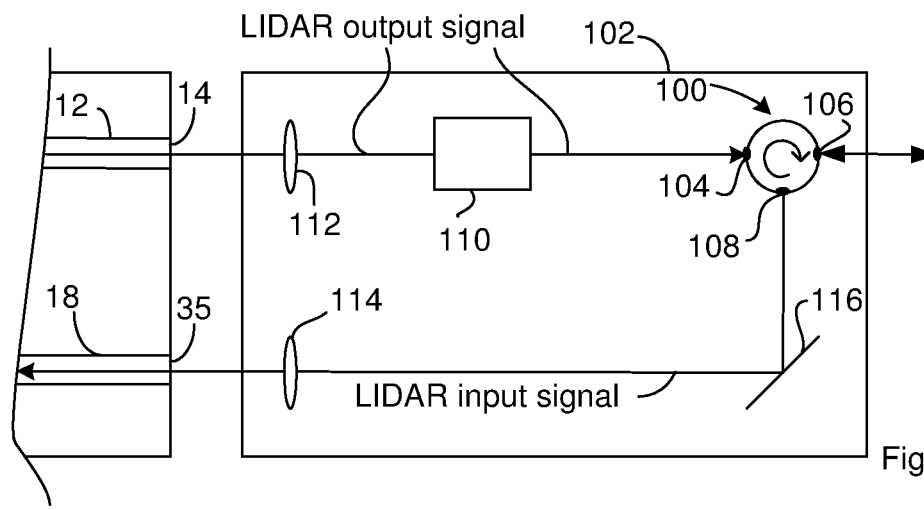
FIG. 2 is a topview of an example of a LIDAR adapter that is suitable for use with the LIDAR chip of FIG. 1B.

An example of a LIDAR adapter that is suitable for use with the LIDAR chip of FIG. 1B is illustrated in FIG. 2. The LIDAR adapter includes multiple components positioned on a base. For instance, the LIDAR adapter includes a circulator 100 positioned on a base 102. The illustrated optical circulator 100 includes three ports and is configured such that light entering one port exits from the next port. For instance, the illustrated optical circulator includes a first port 104, a second port 106, and a third port 108. The LIDAR output signal enters the first port 104 from the utility waveguide 12 of the LIDAR chip and exits from the second port 106.

The LIDAR adapter can be configured such that the output of the LIDAR output signal from the second port 106 can also serve as the output of the LIDAR output signal from the LIDAR adapter and accordingly from the LIDAR system. As a result, the LIDAR output signal can be output from the LIDAR adapter such that the LIDAR output signal is traveling toward a sample region in the field of view. Accordingly, in some instances, the portion of the LIDAR output signal that has exited from the LIDAR adapter can also be considered the system output signal. As an example, when the exit of the LIDAR output signal from the LIDAR adapter is also an exit of the LIDAR output signal from the LIDAR system, the LIDAR output signal can also be considered a system output signal.

The LIDAR output signal output from the LIDAR adapter includes, consists of, or consists essentially of light from the LIDAR output signal received from the LIDAR chip. Accordingly, the LIDAR output signal output from the LIDAR adapter may be the same or substantially the same as the LIDAR output signal received from the LIDAR chip. However, there may be differences between the LIDAR output signal output from the LIDAR adapter and the LIDAR output signal received from the LIDAR chip. For instance, the LIDAR output signal can experience optical loss as it travels through the LIDAR adapter and/or the LIDAR adapter can optionally include an amplifier configured to amplify the LIDAR output signal as it travels through the LIDAR adapter.

When one or more objects in the sample region reflect the LIDAR output signal, at least a portion of the reflected light travels back to the circulator 100 as a system return signal. The system return signal enters the circulator 100 through the second port 106. FIG. 2 illustrates the LIDAR output signal and the system return signal traveling between the LIDAR adapter and the sample region along the same optical path.

The system return signal exits the circulator 100 through the third port 108 and is directed to the comparative waveguide 18 on the LIDAR chip. Accordingly, all or a portion of the system return signal can serve as the first LIDAR input signal and the first LIDAR input signal includes or consists of light from the system return signal. Accordingly, the LIDAR output signal and the first LIDAR input signal travel between the LIDAR adapter and the LIDAR chip along different optical paths.

As is evident from FIG. 2, the LIDAR adapter can include optical components in addition to the circulator 100. For instance, the LIDAR adapter can include components for directing and controlling the optical path of the LIDAR output signal and the system return signal. As an example, the adapter of FIG. 2 includes an optional amplifier 110 positioned so as to receive and amplify the LIDAR output signal before the LIDAR output signal enters the circulator 100. The amplifier 110 can be operated by the electronics 32 allowing the electronics 32 to control the power of the LIDAR output signal.

FIG. 2 also illustrates the LIDAR adapter including an optional first lens 112 and an optional second lens 114. The first lens 112 can be configured to couple the LIDAR output signal to a desired location. In some instances, the first lens 112 is configured to focus or collimate the LIDAR output signal at a desired location. In one example, the first lens 112 is configured to couple the LIDAR output signal on the first port 104 when the LIDAR adapter does not include an amplifier 110. As another example, when the LIDAR adapter includes an amplifier 110, the first lens 112 can be configured to couple the LIDAR output signal on the entry port to the amplifier 110. The second lens 114 can be configured to couple the LIDAR output signal at a desired location. In some instances, the second lens 114 is configured to focus or collimate the LIDAR output signal at a desired location. For instance, the second lens 114 can be configured to couple the LIDAR output signal the on the facet 35 of the comparative waveguide 18.

The LIDAR adapter can also include one or more direction changing components such as mirrors. FIG. 2 illustrates the LIDAR adapter including a mirror as a direction-changing component 116 that redirects the system return signal from the circulator 100 to the facet 20 of the comparative waveguide 18.

The LIDAR chips include one or more waveguides that constrains the optical path of one or more light signals. While the LIDAR adapter can include waveguides, the optical path that the system return signal and the LIDAR output signal travel between components on the LIDAR adapter and/or between the LIDAR chip and a component on the LIDAR adapter can be free space. For instance, the system return signal and/or the LIDAR output signal can travel through the atmosphere in which the LIDAR chip, the LIDAR adapter, and/or the base 102 is positioned when traveling between the different components on the LIDAR adapter and/or between a component on the LIDAR adapter and the LIDAR chip. As a result, optical components such as lenses and direction changing components can be employed to control the characteristics of the optical path traveled by the system return signal and the LIDAR output signal on, to, and from the LIDAR adapter.

Suitable bases 102 for the LIDAR adapter include, but are not limited to, substrates, platforms, and plates. Suitable substrates include, but are not limited to, glass, silicon, and ceramics. The components can be discrete components that are attached to the substrate. Suitable techniques for attaching discrete components to the base 102 include, but are not limited to, epoxy, solder, and mechanical clamping. In one example, one or more of the components are integrated components and the remaining components are discrete components. In another example, the LIDAR adapter includes one or more integrated amplifiers and the remaining components are discrete components.

The LIDAR system can be configured to compensate for polarization. Light from a laser source is typically linearly polarized and hence the LIDAR output signal is also typically linearly polarized. Reflection from an object may change the angle of polarization of the returned light. Accordingly, the system return signal can include light of different linear polarization states. For instance, a first portion of a system return signal can include light of a first linear polarization state and a second portion of a system return signal can include light of a second linear polarization state. The intensity of the resulting composite signals is proportional to the square of the cosine of the angle between the comparative and reference signal polarization fields. If the angle is 90 degrees, the LIDAR data can be lost in the resulting composite signal. However, the LIDAR system can be modified to compensate for changes in polarization state of the LIDAR output signal.

Figure 3:
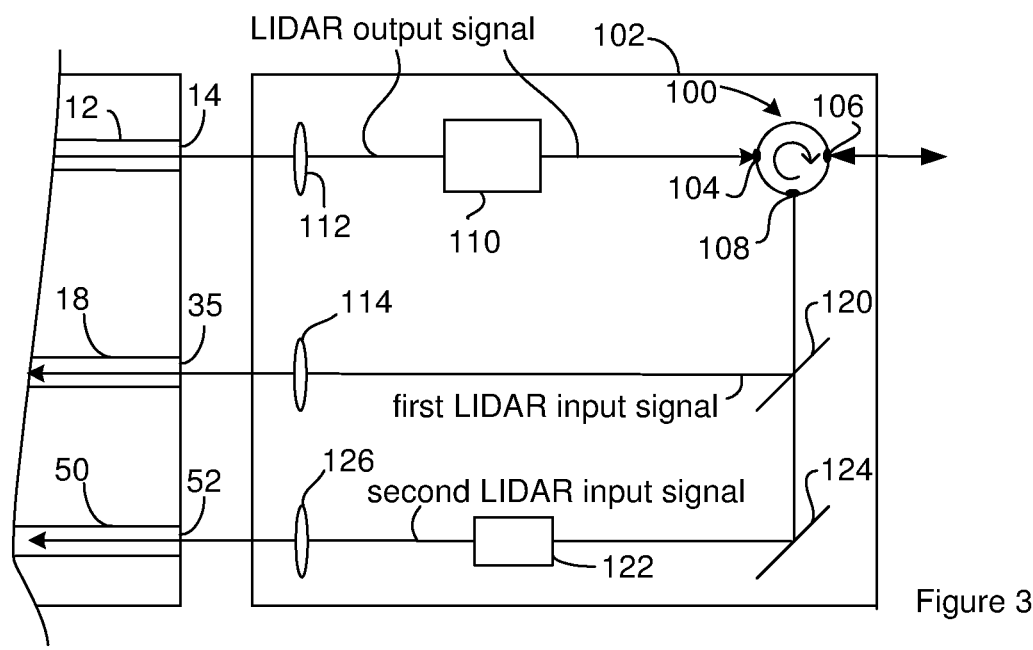
FIG. 3 is a topview of an example of a LIDAR adapter that is suitable for use with the LIDAR chip of FIG. 1C.

FIG. 3 illustrates the LIDAR system of FIG. 3 modified such that the LIDAR adapter is suitable for use with the LIDAR chip of FIG. 1C. The LIDAR adapter includes a beamsplitter 120 that receives the system return signal from the circulator 100. The beamsplitter 120 splits the system return signal into a first portion of the system return signal and a second portion of the system return signal. Suitable beamsplitters include, but are not limited to, Wollaston prisms, and MEMS-based beamsplitters.

The first portion of the system return signal is directed to the comparative waveguide 18 on the LIDAR chip and serves as the first LIDAR input signal described in the context of FIG. 1C. The second portion of the system return signal is directed a polarization rotator 122. The polarization rotator 122 outputs a second LIDAR input signal that is directed to the second input waveguide 76 on the LIDAR chip and serves as the second LIDAR input signal.

The beamsplitter 120 can be a polarizing beam splitter. One example of a polarizing beamsplitter is constructed such that the first portion of the system return signal has a first polarization state but does not have or does not substantially have a second polarization state and the second portion of the system return signal has a second polarization state but does not have or does not substantially have the first polarization state. The first polarization state and the second polarization state can be linear polarization states and the second polarization state is different from the first polarization state. For instance, the first polarization state can be TE and the second polarization state can be TM or the first polarization state can be TM and the second polarization state can be TE. In some instances, the laser source can be linearly polarized such that the LIDAR output signal has the first polarization state. Suitable beamsplitters include, but are not limited to, Wollaston prisms, and MEMs-based polarizing beamsplitters.

A polarization rotator can be configured to change the polarization state of the first portion of the system return signal and/or the second portion of the system return signal. For instance, the polarization rotator 122 shown in FIG. 3 can be configured to change the polarization state of the second portion of the system return signal from the second polarization state to the first polarization state. As a result, the second LIDAR input signal has the first polarization state but does not have or does not substantially have the second polarization state. Accordingly, the first LIDAR input signal and the second LIDAR input signal each have the same polarization state (the first polarization state in this example). Despite carrying light of the same polarization state, the first LIDAR input signal and the second LIDAR input signal are associated with different polarization states as a result of the use of the polarizing beamsplitter. For instance, the first LIDAR input signal carries the light reflected with the first polarization state and the second LIDAR input signal carries the light reflected with the second polarization state. As a result, the first LIDAR input signal is associated with the first polarization state and the second LIDAR input signal is associated with the second polarization state.

Since the first LIDAR input signal and the second LIDAR carry light of the same polarization state, the comparative signals that result from the first LIDAR input signal have the same polarization angle as the comparative signals that result from the second LIDAR input signal.

Suitable polarization rotators include, but are not limited to, rotation of polarization-maintaining fibers, Faraday rotators, half-wave plates, MEMs-based polarization rotators and integrated optical polarization rotators using asymmetric y-branches, Mach-Zehnder interferometers and multimode interference couplers.

Since the outgoing LIDAR signal is linearly polarized, the first reference signals can have the same linear polarization state as the second reference signals. Additionally, the components on the LIDAR adapter can be selected such that the first reference signals, the second reference signals, the comparative signals and the second comparative signals each have the same polarization state. In the example disclosed in the context of FIG. 3, the first comparative signals, the second comparative signals, the first reference signals, and the second reference signals can each have light of the first polarization state.

As a result of the above configuration, first composite signals generated by the first processing component 46 and second composite signals generated by the second processing component 48 each results from combining a reference signal and a comparative signal of the same polarization state and will accordingly provide the desired beating between the reference signal and the comparative signal. For instance, the composite signal results from combining a first reference signal and a first comparative signal of the first polarization state and excludes or substantially excludes light of the second polarization state or the composite signal results from combining a first reference signal and a first comparative signal of the second polarization state and excludes or substantially excludes light of the first polarization state. Similarly, the second composite signal includes a second reference signal and a second comparative signal of the same polarization state will accordingly provide the desired beating between the reference signal and the comparative signal. For instance, the second composite signal results from combining a second reference signal and a second comparative signal of the first polarization state and excludes or substantially excludes light of the second polarization state or the second composite signal results from combining a second reference signal and a second comparative signal of the second polarization state and excludes or substantially excludes light of the first polarization state.

The above configuration results in the LIDAR data for a single sample region in the field of view being generated from multiple different composite signals (i.e., first composite signals and the second composite signal) from the sample region. In some instances, determining the LIDAR data for the sample region includes the electronics combining the LIDAR data from different composite signals (i.e., the composite signals and the second composite signal). Combining the LIDAR data can include taking an average, median, or mode of the LIDAR data generated from the different composite signals. For instance, the electronics can average the distance between the LIDAR system and the reflecting object determined from the composite signal with the distance determined from the second composite signal and/or the electronics can average the radial velocity between the LIDAR system and the reflecting object determined from the composite signal with the radial velocity determined from the second composite signal.

In some instances, determining the LIDAR data for a sample region includes the electronics identifying one or more composite signals (i.e., the composite signal and/or the second composite signal) as the source of the LIDAR data that is most represents reality (the representative LIDAR data). The electronics can then use the LIDAR data from the identified composite signal as the representative LIDAR data to be used for additional processing. For instance, the electronics can identify the signal (composite signal or the second composite signal) with the larger amplitude as having the representative LIDAR data and can use the LIDAR data from the identified signal for further processing by the LIDAR system. In some instances, the electronics combine identifying the composite signal with the representative LIDAR data with combining LIDAR data from different LIDAR signals. For instance, the electronics can identify each of the composite signals with an amplitude above an amplitude threshold as having representative LIDAR data and when more than two composite signals are identified as having representative LIDAR data, the electronics can combine the LIDAR data from each of identified composite signals. When one composite signal is identified as having representative LIDAR data, the electronics can use the LIDAR data from that composite signal as the representative LIDAR data. When none of the composite signals is identified as having representative LIDAR data, the electronics can discard the LIDAR data for the sample region associated with those composite signals.

Although FIG. 3 is described in the context of components being arranged such that the first comparative signals, the second comparative signals, the first reference signals, and the second reference signals each have the first polarization state, other configurations of the components in FIG. 3 can arranged such that the composite signals result from combining a reference signal and a comparative signal of the same linear polarization state and the second composite signal results from combining a reference signal and a comparative signal of the same linear polarization state. For instance, the beamsplitter 120 can be constructed such that the second portion of the system return signal has the first polarization state and the first portion of the system return signal has the second polarization state, the polarization rotator receives the first portion of the system return signal, and the outgoing LIDAR signal can have the second polarization state. In this example, the first LIDAR input signal and the second LIDAR input signal each has the second polarization state.

The above system configurations result in the first portion of the system return signal and the second portion of the system return signal being directed into different composite signals. As a result, since the first portion of the system return signal and the second portion of the system return signal are each associated with a different polarization state but electronics can process each of the composite signals, the LIDAR system compensates for changes in the polarization state of the LIDAR output signal in response to reflection of the LIDAR output signal.

The LIDAR adapter of FIG. 3 can include additional optical components including passive optical components. For instance, the LIDAR adapter can include an optional third lens 126. The third lens 126 can be configured to couple the second LIDAR output signal at a desired location. In some instances, the third lens 126 focuses or collimates the second LIDAR output signal at a desired location. For instance, the third lens 126 can be configured to focus or collimate the second LIDAR output signal on the facet 52 of the second comparative waveguide 50. The LIDAR adapter also includes one or more direction changing components 124 such as mirrors and prisms. FIG. 3 illustrates the LIDAR adapter including a mirror as a direction changing component 124 that redirects the second portion of the system return signal from the circulator 100 to the facet 52 of the second comparative waveguide 50 and/or to the third lens 126.

Figure 4:
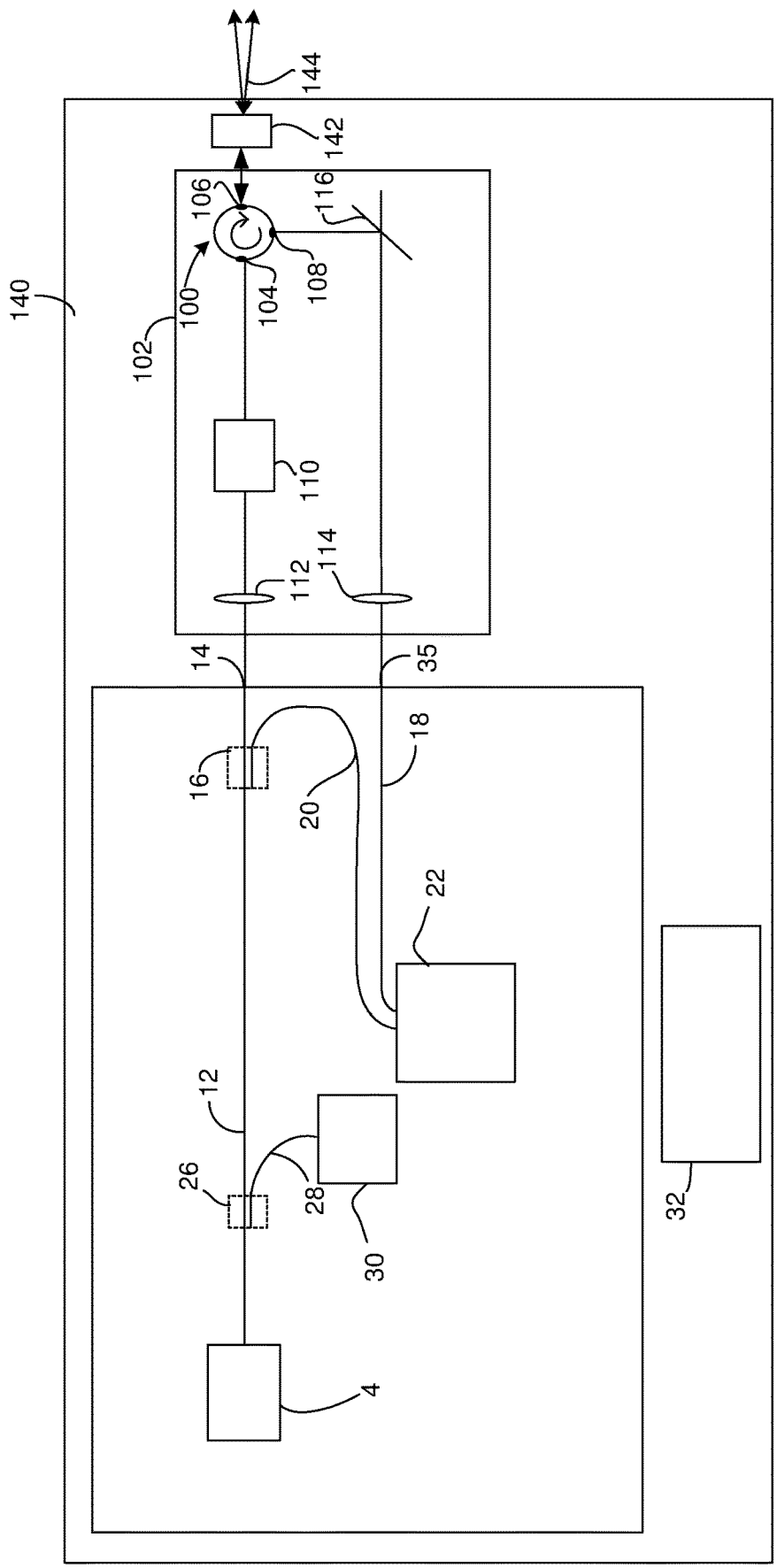
FIG. 4 is a topview of an example of a LIDAR system that includes the LIDAR chip of FIG. 1A and the LIDAR adapter of FIG. 2 on a common support.

When the LIDAR system includes a LIDAR chip and a LIDAR adapter, the LIDAR chip, electronics, and the LIDAR adapter can be positioned on a common mount. Suitable common mounts include, but are not limited to, glass plates, metal plates, silicon plates and ceramic plates. As an example, FIG. 4 is a topview of a LIDAR system that includes the LIDAR chip and electronics 32 of FIG. 1A and the LIDAR adapter of FIG. 2 on a common support 140.

Although the electronics 32 are illustrated as being located on the common support, all or a portion of the electronics can be located off the common support. When the light source 4 is located off the LIDAR chip, the light source can be located on the common support 140 or off of the common support 140. Suitable approaches for mounting the LIDAR chip, electronics, and/or the LIDAR adapter on the common support include, but are not limited to, epoxy, solder, and mechanical clamping.

The LIDAR systems can include components including additional passive and/or active optical components. For instance, the LIDAR system can include one or more components that receive the LIDAR output signal from the LIDAR chip or from the LIDAR adapter. The portion of the LIDAR output signal that exits from the one or more components can serve as the system output signal. As an example, the LIDAR system can include one or more beam steering components that receive the LIDAR output signal from the LIDAR chip or from the LIDAR adapter and that output all or a fraction of the LIDAR output signal that serves as the system output signal. For instance, FIG. 4 illustrates a beam steering component 142 that receive a LIDAR output signal from the LIDAR adapter. Although FIG. 4 shows the beam steering component positioned on the common support 140, the beam steering component can be positioned on the LIDAR chip, on the LIDAR adapter, off the LIDAR chip, or off the common support 140. Suitable beam steering components include, but are not limited to, movable mirrors, MEMS mirrors, optical phased arrays (OPAs), and actuators that move the LIDAR chip, LIDAR adapter, and/or common support.

The electronics can operate the one or more beam steering component 142 so as to steer the system output signal to different sample regions 144. The sample regions can extend away from the LIDAR system to a maximum distance for which the LIDAR system is configured to provide reliable LIDAR data. The sample regions can be stitched together to define the field of view. For instance, the field of view of for the LIDAR system includes or consists of the space occupied by the combination of the sample regions.

Figure 5A:
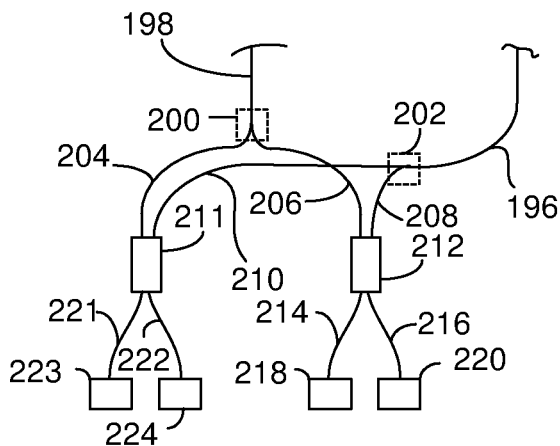
FIG. 5A illustrates an example of a processing component suitable for use with the LIDAR systems.
Figure 5B:
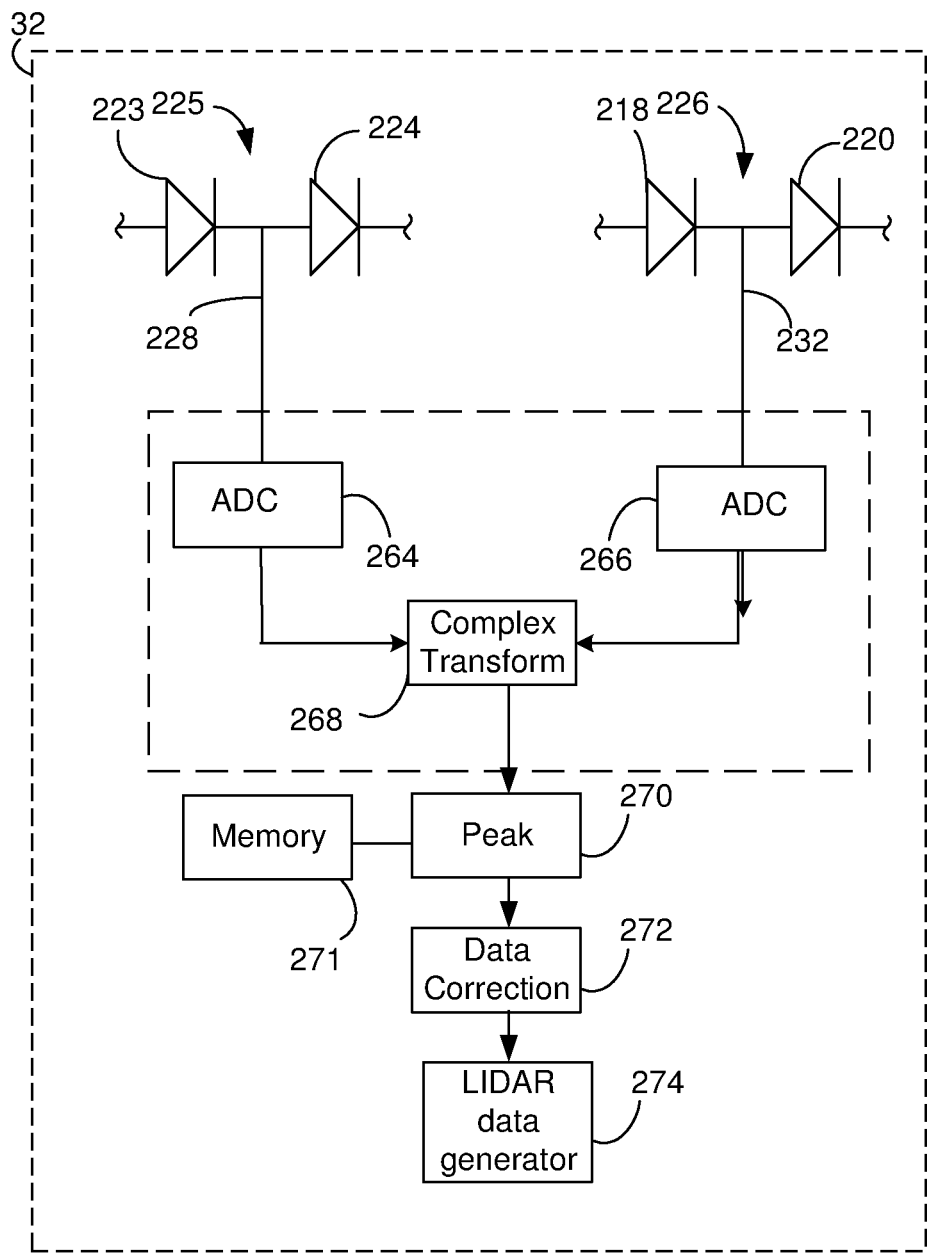
FIG. 5B provides a schematic of electronics that are suitable for use with a processing component constructed according to FIG. 5A.
Figure 5C:
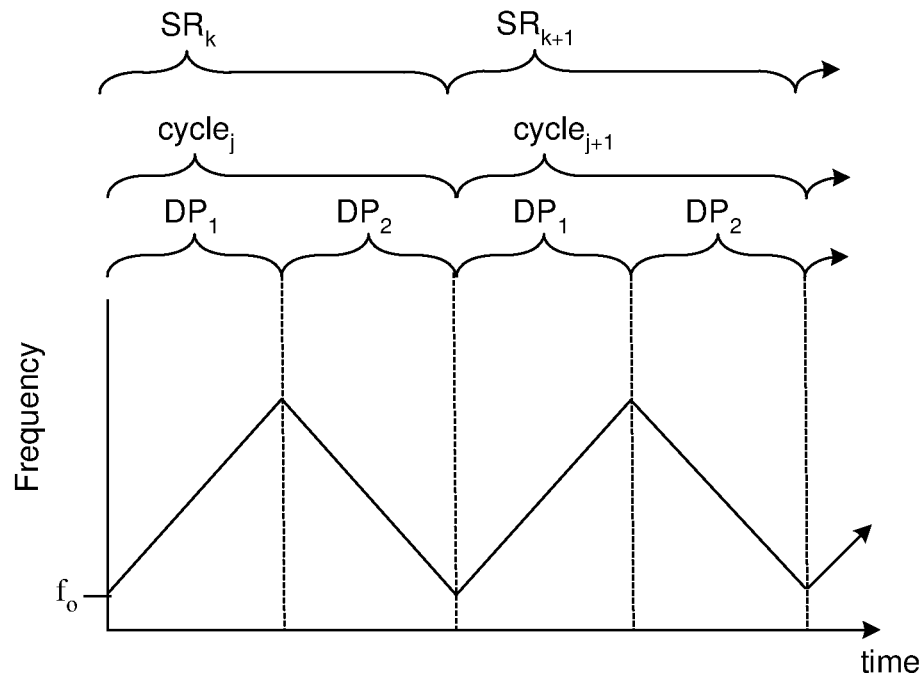
FIG. 5C is a graph of frequency versus time for a system output signal.

FIG. 5A through FIG. 5C illustrate an example of a suitable processing component for use as all or a fraction of the processing components selected from the group consisting of the processing component 22, the first processing component 46 and the second processing component 48. The processing component receives a comparative signal from a comparative waveguide 196 and a reference signal from a reference waveguide 198. The comparative waveguide 18 and the reference waveguide 20 shown in FIG. 1A and FIG. 1B can serve as the comparative waveguide 196 and the reference waveguide 198, the comparative waveguide 18 and the first reference waveguide 42 shown in FIG. 1C can serve as the comparative waveguide 196 and the reference waveguide 198, or the second comparative waveguide 50 and the second reference waveguide 44 shown in FIG. 1C can serve as the comparative waveguide 196 and the reference waveguide 198.

The processing component includes a second splitter 200 that divides the comparative signal carried on the comparative waveguide 196 onto a first comparative waveguide 204 and a second comparative waveguide 206. The first comparative waveguide 204 carries a first portion of the comparative signal to the light-combining component 211. The second comparative waveguide 208 carries a second portion of the comparative signal to the second light-combining component 212.

The processing component includes a first splitter 202 that divides the reference signal carried on the reference waveguide 198 onto a first reference waveguide 204 and a second reference waveguide 206. The first reference waveguide 204 carries a first portion of the reference signal to the light-combining component 211. The second reference waveguide 208 carries a second portion of the reference signal to the second light-combining component 212.

The second light-combining component 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal.

The second light-combining component 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second light-combining component 212 splits the second composite signal such that the portion of the comparative signal (i.e., the portion of the second portion of the comparative signal) included in the first portion of the second composite signal is phase shifted by 180° relative to the portion of the comparative signal (i.e., the portion of the second portion of the comparative signal) in the second portion of the second composite signal but the portion of the reference signal (i.e., the portion of the second portion of the reference signal) in the second portion of the second composite signal is not phase shifted relative to the portion of the reference signal (i.e., the portion of the second portion of the reference signal) in the first portion of the second composite signal. Alternately, the second light-combining component 212 splits the second composite signal such that the portion of the reference signal (i.e., the portion of the second portion of the reference signal) in the first portion of the second composite signal is phase shifted by 180° relative to the portion of the reference signal (i.e., the portion of the second portion of the reference signal) in the second portion of the second composite signal but the portion of the comparative signal (i.e., the portion of the second portion of the comparative signal) in the first portion of the second composite signal is not phase shifted relative to the portion of the comparative signal (i.e., the portion of the second portion of the comparative signal) in the second portion of the second composite signal. Examples of suitable light sensors include germanium photodiodes (PDs), and avalanche photodiodes (APDs).

The first light-combining component 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The first light-combining component 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second light sensor 224 that converts the second portion of the second composite signal to a second electrical signal. Examples of suitable light sensors include germanium photodiodes (PDs), and avalanche photodiodes (APDs).

In some instances, the light-combining component 211 splits the first composite signal such that the portion of the comparative signal (i.e., the portion of the first portion of the comparative signal) included in the first portion of the composite signal is phase shifted by 180° relative to the portion of the comparative signal (i.e., the portion of the first portion of the comparative signal) in the second portion of the composite signal but the portion of the reference signal (i.e., the portion of the first portion of the reference signal) in the first portion of the composite signal is not phase shifted relative to the portion of the reference signal (i.e., the portion of the first portion of the reference signal) in the second portion of the composite signal. Alternately, the light-combining component 211 splits the composite signal such that the portion of the reference signal (i.e., the portion of the first portion of the reference signal) in the first portion of the composite signal is phase shifted by 180° relative to the portion of the reference signal (i.e., the portion of the first portion of the reference signal) in the second portion of the composite signal but the portion of the comparative signal (i.e., the portion of the first portion of the comparative signal) in the first portion of the composite signal is not phase shifted relative to the portion of the comparative signal (i.e., the portion of the first portion of the comparative signal) in the second portion of the composite signal.

When the second light-combining component 212 splits the second composite signal such that the portion of the comparative signal in the first portion of the second composite signal is phase shifted by 180° relative to the portion of the comparative signal in the second portion of the second composite signal, the light-combining component 211 also splits the composite signal such that the portion of the comparative signal in the first portion of the composite signal is phase shifted by 180° relative to the portion of the comparative signal in the second portion of the composite signal. When the second light-combining component 212 splits the second composite signal such that the portion of the reference signal in the first portion of the second composite signal is phase shifted by 180° relative to the portion of the reference signal in the second portion of the second composite signal, the light-combining component 211 also splits the composite signal such that the portion of the reference signal in the first portion of the composite signal is phase shifted by 180° relative to the portion of the reference signal in the second portion of the composite signal.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 223 and the second light sensor 224 can be connected as a balanced detector and the first auxiliary light sensor 218 and the second auxiliary light sensor 220 can also be connected as a balanced detector. For instance, FIG. 5B provides a schematic of the relationship between the electronics, the first light sensor 223, the second light sensor 224, the first auxiliary light sensor 218, and the second auxiliary light sensor 220. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 5B are included on the LIDAR chip. In some instances, the components illustrated in the schematic of FIG. 5B are distributed between the LIDAR chip and electronics located off of the LIDAR chip.

The electronics connect the first light sensor 223 and the second light sensor 224 as a first balanced detector 225 and the first auxiliary light sensor 218 and the second auxiliary light sensor 220 as a second balanced detector 226. In particular, the first light sensor 223 and the second light sensor 224 are connected in series. Additionally, the first auxiliary light sensor 218 and the second auxiliary light sensor 220 are connected in series. The serial connection in the first balanced detector is in communication with a first data line 228 that carries the output from the first balanced detector as a first data signal. The serial connection in the second balanced detector is in communication with a second data line 232 that carries the output from the second balanced detector as a second data signal. The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e., the beating in the first composite signal and in the second composite signal.

The electronics 32 includes a transform mechanism 238 configured to perform a mathematical transform on the first data signal and the second data signal. For instance, the mathematical transform can be a complex Fourier transform with the first data signal and the second data signal as inputs. Since the first data signal is an in-phase component and the second data signal its quadrature component, the first data signal and the second data signal together act as a complex data signal where the first data signal is the real component and the second data signal is the imaginary component of the input.

The transform mechanism 238 includes a first Analog-to-Digital Converter (ADC) 264 that receives the first data signal from the first data line 228. The first Analog-to-Digital Converter (ADC) 264 converts the first data signal from an analog form to a digital form and outputs a first digital data signal. The transform mechanism 238 includes a second Analog-to-Digital Converter (ADC) 266 that receives the second data signal from the second data line 232. The second Analog-to-Digital Converter (ADC) 266 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The transform mechanism 238 includes a transform component 268 that receives the complex data signal. For instance, the transform component 268 receives the first digital data signal from the first Analog-to-Digital Converter (ADC) 264 as an input and also receives the second digital data signal from the second Analog-to-Digital Converter (ADC) 266 as an input. The transform component 268 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the shift in frequency of LIDAR input signal relative to the LIDAR output signal that is caused by the radial velocity between the reflecting object and the LIDAR chip. The electronics use the one or more frequency peaks output from the transform component 268 for further processing to generate the LIDAR data (distance and/or radial velocity between the reflecting object and the LIDAR chip or LIDAR system). The transform component 268 can execute the attributed functions using firmware, hardware or software or a combination thereof.

The electronics 32 includes a peak finder 270 that receives output from the transform component 268. The peak finder 270 in configured to find a peak in output of the transform component 268 in order to identify the beat frequency of the composite optical signal. The mathematical transform can be a complex transform such as a complex Fast Fourier Transform (FFT). A complex transform such as a complex Fast Fourier Transform (FFT) provides an unambiguous solution for the beat frequency of the composite optical signal. The peak finder 270 can store the beat frequencies in a memory 271 for later use by a data correction component 272 and by a LIDAR data generator 274. As will be described in more detail below, the beat frequencies can each be stored as $f_{m,j}$ where m represents the period index and j represents the cycle index. The LIDAR data generator 274 uses the beat frequencies to generate the LIDAR data (distance and/or radial velocity between the reflecting object and the LIDAR chip or LIDAR system). Suitable memories 271 include, but are not limited to, buffers.

Although FIG. 5A illustrates light-combining components that combine a portion of the reference signal with a portion of the comparative signal, the processing component can include a single light-combining component that combines the reference signal with the comparative signal so as to form a composite signal. As a result, at least a portion of the reference signal and at least a portion of the comparative signal can be combined to form a composite signal. The combined portion of the reference signal can be the entire reference signal or a fraction of the reference signal and the combined portion of the comparative signal can be the entire comparative signal or a fraction of the comparative signal.

The electronics tune the frequency of the system output signal over time. The system output signal has a frequency versus time pattern with a repeated cycle. FIG. 5C shows an example of a suitable frequency versus time pattern for the system output signal. The base frequency of the system output signal ($f_o$) can be the frequency of the system output signal at the start of a cycle.

FIG. 5C shows frequency versus time for a sequence of two cycles labeled $cycle_j$ and $cycle_{j+1}$ where j represents a cycle index. In some instances, the frequency versus time pattern is repeated in each cycle as shown in FIG. 5C. The illustrated cycles do not include re-location periods and/or re-location periods are not located between cycles. As a result, FIG. 5C illustrates the results for a continuous scan.

Each cycle includes M data periods that are each associated with a period index m and are labeled $DP_m$. In the example of FIG. 5C, each cycle includes three data periods labeled $DP_m$ with m=1 and 2. In some instances, the frequency versus time pattern is the same for the data periods that correspond to each other in different cycles as is shown in FIG. 5C. Corresponding data periods are data periods with the same period index. As a result, each data period $DP_1$ can be considered corresponding data periods and the associated frequency versus time patterns are the same in FIG. 5C. At the end of a cycle, the electronics return the frequency to the same frequency level at which it started the previous cycle.

During the data period $DP_m$, the electronics operate the light source such that the frequency of the system output signal changes at a linear rate $\alpha_m$ (the chirp rate). In FIG. 5C, $\alpha_2 = -\alpha_1$.

FIG. 5C labels sample regions that are each associated with a sample region index k and are labeled $SR_k$. FIG. 5C labels sample regions $SR_{k-1}$ through $SR_{k+1}$. Each sample region is illuminated with the system output signal during the data periods that FIG. 5C shows as associated with the sample region. For instance, sample region $SR_{k+1}$ is illuminated with the system output signal during the data period labeled $DP_2$ within cycle j+1 and the data period labeled $DP_1$ within cycle j+1. Accordingly, the sample region labeled $SR_{k+1}$ is associated with the data periods labeled $DP_1$ and $DP_2$ within cycle j+1. The sample region indices k can be assigned relative to time. For instance, the samples regions can be illuminated by the system output signal in the sequence indicated by the index k. As a result, the sample region $SR_{10}$ can be illuminated after sample region $SR_9$ and before $SR_{11}$.

The frequency output from the Complex Fourier transform represents the beat frequency of the composite signals that each includes a comparative signal beating against a reference signal. The beat frequencies from two or more different data periods that are associated with the same sample region can be combined to generate the LIDAR data. For instance, the beat frequency determined from $DP_1$ during the illumination of sample region $SR_k$ can be combined with the beat frequency determined from $DP_2$ during the illumination of sample region $SR_k$ to determine the LIDAR data for sample region $SR_k$. As an example, the following equation applies during a data period where electronics increase the frequency of the outgoing LIDAR signal during the data period such as occurs in data period $DP_1$ of FIG. 5C: $f_{ub} = -f_d + \alpha_u \tau$ where $f_{ub}$ is the beat frequency provided by the transform component, $\tau$ is the roundtrip delay (time between the system output signal exiting from the LIDAR system and the system return signal returning to the LIDAR system), $f_d$ represents the Doppler shift ($f_d = 2V_k f_c/c$) where $f_c$ represents the optical frequency ($f_o$), c represents the speed of light, $V_k$ is the radial velocity between the reflecting object and the LIDAR system where the direction from the reflecting object toward the chip is assumed to be the positive direction, c is the speed of light, and $\alpha_u$ represents a chirp rate ($\alpha_m$) for the data period where the frequency of the system output signal increases with time ($\alpha_1$ in this case). The following equation applies during a data period where electronics decrease the frequency of the outgoing LIDAR signal such as occurs in data period $DP_2$ of FIG. 5C: $f_{db} = -f_d - \alpha_d \tau$ where $f_{db}$ is a frequency provided by the transform component, and $\alpha_d$ represents the chirp rate ($\alpha_m$) for the data period where the frequency of the system output signal increases with time ($\alpha_2$ in this case). In these two equations, $f_d$ and $\tau$ are unknowns. These equations can be solved for the two unknowns and the electronics can then determine the radial velocity for sample region k ($V_k$) from the Doppler shift ($V_k = c * f_d/(2f_c)$) and/or the separation distance for sample region k ($R_k$) can be determined from $c*\tau/2$. The radial velocity and/or separation distance determined for a sample region can represent LIDAR data for the sample region.

Figure 5D:
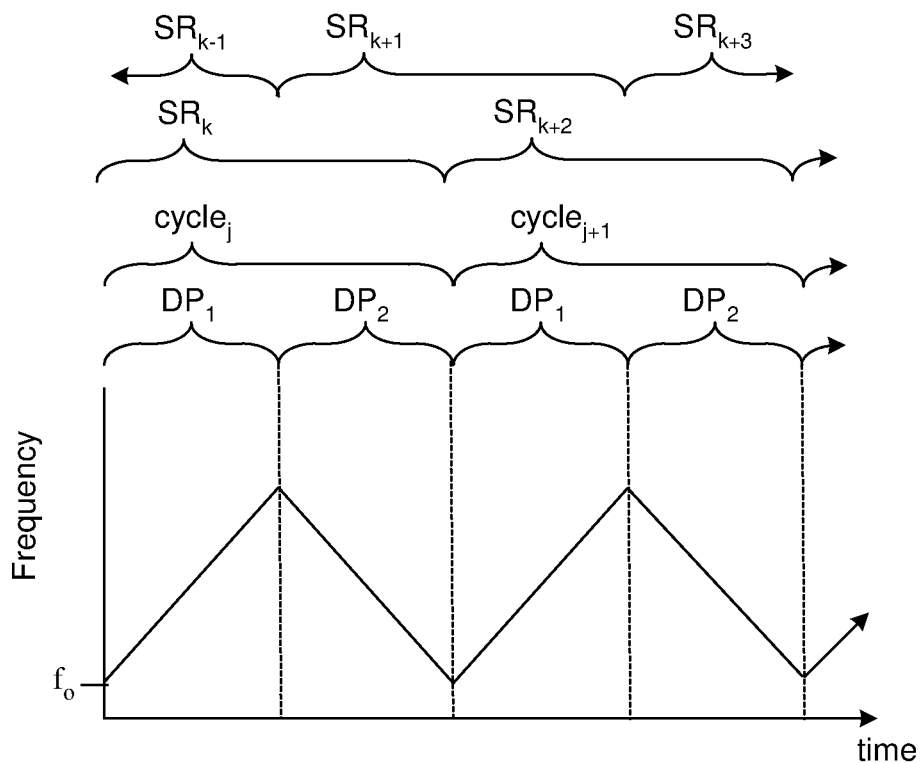
FIG. 5D is another embodiment of a graph of frequency versus time for a system output signal.

FIG. 5D illustrates another scheme for generating the LIDAR data. For instance, FIG. 5D illustrates the frequency versus time pattern of FIG. 5C but is modified so the sample regions are labeled $SR_{k-1}$ through $SR_{k+3}$. Each sample region is illuminated with the system output signal during the data periods that FIG. 5C shows as associated with the sample region. For instance, sample region $SR_{k+1}$ is illuminated with the system output signal during the data period labeled $DP_2$ within cycle j and the data period labeled $DP_1$ within cycle j+1. Accordingly, the sample region labeled $SR_{k+1}$ is associated with the data period labeled $DP_2$ within cycle j and the data period labeled $DP_1$ within cycle j+1.

As is evident from FIG. 5D, a data period is with multiple sample regions. For instance, the data period labeled $DP_2$ within cycle j is associated with the sample region labeled $SR_{k+1}$ and the sample region labeled $SR_k$. Accordingly, different groups of data periods can share a common data period. However, groups that share a common data period can each include one or more data periods that are not shared by the group. Since a sample region is illuminated by the system output signal during an associated data period and different sample regions can be associated with the same data period, different sample regions can overlap one another.

The system output signal can be chirped during at least a portion of the data periods in the same cycle. The chirp can be constant and continue for the duration of the data period. For instance, during the data periods labeled $DP_1$, and the data periods labeled $DP_2$, the electronics operate the light source such that the frequency of the system output signal changes at a linear rate α. The direction of the frequency change during the data period $DP_1$ is the opposite of the direction of the frequency change during the data period $DP_2$. Accordingly, the chirp of the system output signal can be different for different data periods within the same cycle.

The frequency output from the Complex Fourier transform represents the beat frequency of the composite signals that each includes a comparative signal beating against a reference signal. The LIDAR data for a sample region can be generated from the beat frequencies ($f_{LDP}$) from the group of data periods associated with the sample region. Accordingly, the electronics generate a set of LIDAR data for a sample region from light that is included in the system output signal during a group of multiple data periods. For instance, the beat frequency determined from $DP_1$ in cycle j can be combined with the beat frequency determined from $DP_2$ in cycle j to determine LIDAR data for the sample region labeled $SR_k$. Accordingly, the electronics generate a set of LIDAR data for the sample region $SR_k$ from a group data periods that includes the data periods labeled $DP_1$ and $DP_2$ in cycle j.

As an example of how LIDAR data for a sample region is determined from a group of data periods, the following equation applies during a data period where electronics increase the frequency of the outgoing LIDAR signal during the data period such as occurs in data period $DP_1$ in cycle j of FIG. 5D: $f_{ub} = -f_d + \alpha\tau$ where $f_{ub}$ is the frequency provided by the transform component 268 ($f_{LDP}$ determined from $DP_1$ in this case), τ is the roundtrip delay (time between the system output signal exiting from the LIDAR system and the system return signal returning to the LIDAR system), $f_d$ represents the Doppler shift ($f_d = 2vf_c/c$) where $f_c$ represents the optical frequency ($f_o$), c represents the speed of light, v is the radial velocity between the reflecting object and the LIDAR system where the direction from the reflecting object toward the LIDAR system is assumed to be the positive direction, and c is the speed of light. The following equation applies during a data period where electronics decrease the frequency of the outgoing LIDAR signal such as occurs in data period $DP_2$ in cycle j of FIG. 5D: $f_{db} = -f_d - \alpha\tau$ where $f_{db}$ is a frequency provided by the transform component 268 ($f_{i,LDP}$ determined from $DP_2$ in this case). In these two equations, $f_d$ and τ are unknowns. The electronics solve these two equations for the two unknowns $f_d$ and τ. The radial velocity for the sample region then be quantified from the Doppler shift ($v = c * f_d/(2f_c)$) and/or the separation distance for that sample region can be quantified from $c*\tau/2$.

The above example discloses generation of LIDAR data for a sample region ($SR_k$) from a group of data periods that fall within the same cycle (cycle$_j$). However, the LIDAR data for a sample region can be generated for a group of data periods that include data periods from different cycles. For instance, the LIDAR data can be generated for the sample region labeled $SR_{k+1}$ using the associated data periods. For instance, the LIDAR data for the sample region labeled $SR_{k+1}$ can be generated as described above using the value of $f_{db}$ from the data period labeled $DP_2$ within cycle j and the value of $f_{ub}$ from the data period labeled $DP_1$ within cycle j+1.

Figure 5E:
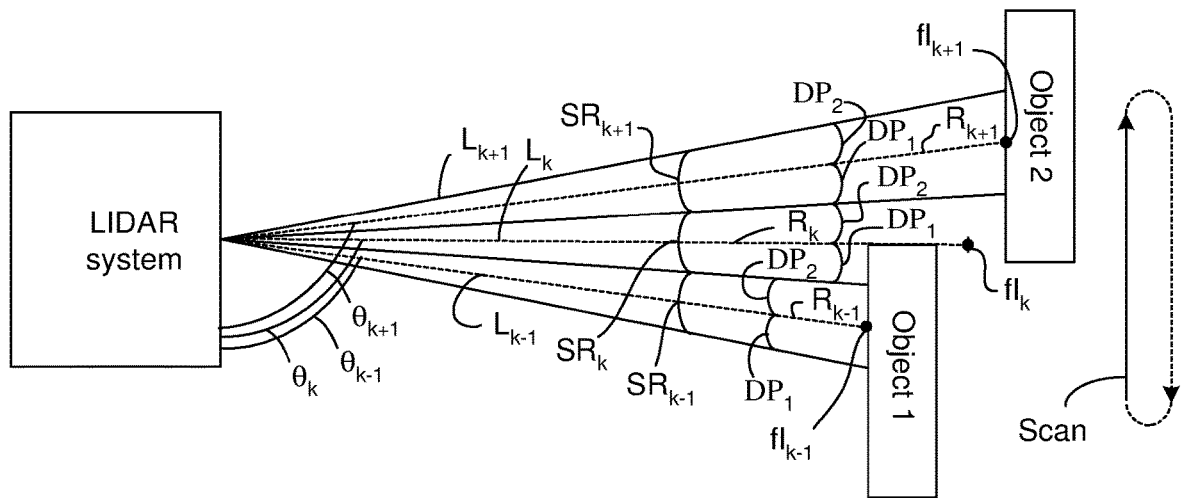
FIG. 5E is a diagram illustrating the edge effect as a source of errors in LIDAR data.

FIG. 5E illustrates a possible source of errors in the calculation of the LIDAR data. FIG. 5E illustrates two different objects located in the field of view of a LIDAR system. The LIDAR system outputs a system output signal that is scanned in the direction of the solid line labeled "scan." The system output signal is scanned through a series of sample regions labeled $SR_{k-1}$ through $SR_{k+1}$. The sample regions are labeled according to the scheme of FIG. 5C and accordingly does not include overlapping sample region as occurs in the scheme of FIG. 5D.

The collection of sample regions that are scanned by the system output signal make up the field of view for the LIDAR system. The object(s) in the field of view can change with time. As a result, the locations of the sample regions are determined relative to the LIDAR system rather than relative to the atmosphere in which the LIDAR system is positioned. For instance, the sample regions can be defined as being located within a range of angles relative to the LIDAR system. The dashed line in FIG. 5E illustrates that the scan of the sample regions in the field of view can be repeated in multiple scan cycles. Accordingly, each scan cycle can scan the system output signal through the same sample regions when the objects in the field of view have moved and/or changed. The sample regions in the field of view can be scanned in the same sequence during different scan cycles or can be scanned in different sequences in in different scan cycles.

The portion of each sample region that corresponds to one of the data periods are each labeled $DP_1$ or $DP_2$ in FIG. 5E. The chirp rate during data period $DP_1$ is $\alpha_1$ and the chirp rate during the data period $DP_2$ is $\alpha_2$. The duration of a data period can be equal to the duration of the chirp during that data period.

The movement of the system output signal, causes the system output signal to go from being incident on object 1 during illumination of the sample region labeled $SR_{k-1}$ to being incident on object 2 during illumination of the sample region labeled $SR_k$. As a result, the system output signal is incident on different objects during a portion of data period $DP_1$ and a portion of data period $DP_2$. The change in the object that receives the system output signal during the illumination of sample region $SR_k$ can be a source of error in the LIDAR data that is generated for sample region $SR_k$. For instance, FIG. 5E includes dashed lines labeled $R_{k-1}$ through $R_{k+1}$ where $R_k$ represents the value that the electronics determine for the distance between the LIDAR system and an object as a result of the system output signal transmitted during sample region $SR_k$. As is evident from the distance labeled $R_k$, the change in the object that is illuminated by the system output signal during the illumination of a sample region can produce an error in the distance measured for that sample region. A similar error occurs for the radial velocity calculated for that sample region.

Figure 5F:
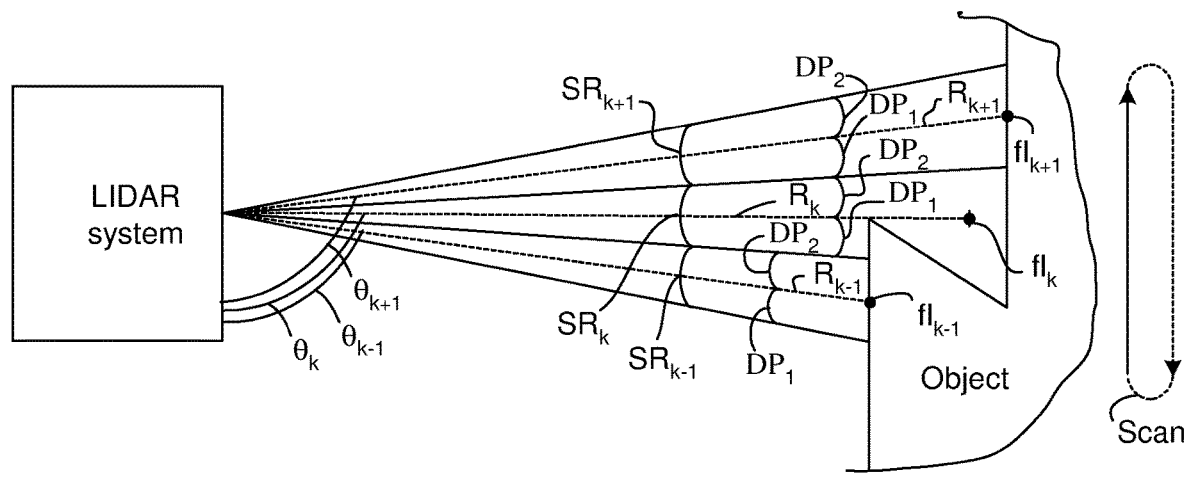
FIG. 5F is a diagram illustrating the edge effect as a source of errors in LIDAR data.

The source of the LIDAR data error illustrated in FIG. 5E results from the system output signal being incident on an edge of an object during the illumination of a sample region. As a result, the error can be considered an edge effect error. While the error is illustrated as occurring due to different objects, it can also occur with a single object. For instance, the error can also occur when scanning a system output signal across an edge of an object during the illumination of a sample region causes the system output signal to be incident on different surfaces of the object. FIG. 5F illustrates FIG. 5E modified so the edge is on a single object. As a result, an edge can be a perimeter edge as shown in FIG. 5E or an interior edge as shown in FIG. 5F.

Figure 6A:
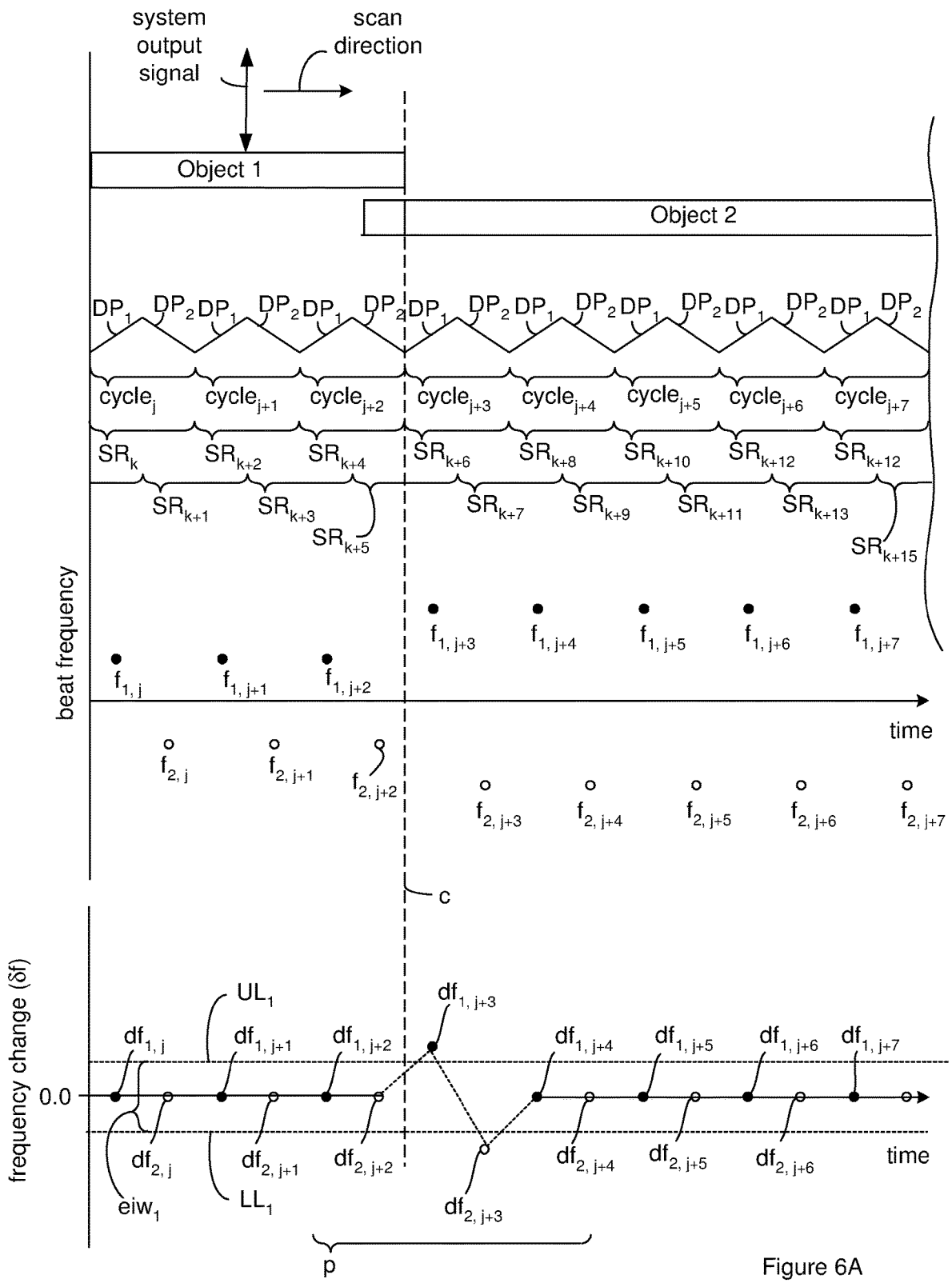
FIG. 6A is a graph illustrating a relationship between a frequency versus time pattern for a system output signal and a beat frequency versus time pattern that occurs when an abrupt edge of an object is present in the field of view of a LIDAR system.

The inventors have found that the beat frequency of the composite signal exhibits particular patterns as the system output signal is scanned across an edge. To illustrate this pattern, FIG. 6A shows two objects (labeled object 1 and object 2) positioned on a graph of the beat frequency versus time. The position of the system output signal relative to these objects as a function of time is also shown at the top of the graph. Also shown on FIG. 6A is the frequency versus time pattern of FIG. 5D extended to j+7 cycles. As is evident from the vertical dashed line, the objects are positioned such that the system output signal is incident on an edge of object 2 and that edge is positioned at the change from a data period labeled $DP_2$ of $cycle_{j+2}$ to the data period labeled $DP_1$ of $cycle_{j+3}$. Accordingly, the system output signal changes from a frequency upramp to a frequency downramp at the edge of object 2.

FIG. 6A also shows the beat frequencies ($f_{ub}$ and $f_{db}$) that the peak finder determines for each of the data periods. Because the frequency of the system output signal increases during the data periods labeled $DP_1$, each beat frequency during a data period labeled $DP_1$ can serve as a $f_{ub}$ in the above equations for calculating the LIDAR data. Because the frequency of the system output signal decreases during the data periods labeled $DP_2$, each beat frequency during a data period labeled $DP_2$ can serve as an $f_{db}$ in the above equations for calculating the LIDAR data. Because there are multiple $f_{ub}$ and $f_{db}$ values shown in FIG. 6A, the $f_{ub}$ and $f_{db}$ values are re-labeled so each value can be uniquely identified. For instance, $f_{ub}$ and $f_{db}$ values are re-labeled $f_{m,j}$ where m represents the period index and j represents the cycle index. Accordingly, $f_{2,3}$ represents the beat frequency determined for $DP_2$ in the third cycle. As a result, the $f_{ub}$ values are each represented by a different one of the $f_{1,j}$ values and the $f_{db}$ values are each represented by a different one of the $f_{2,j}$ values.

In FIG. 6A, the $f_{1,j}$ values remain substantially constant at a first value until the system output signal switches objects and then the $f_{1,j}$ values remain substantially constant at a second value. Similarly, the $f_{2,j}$ values remain substantially constant at a third value until the system output signal switches objects and then the $f_{2,j}$ values remain substantially constant at a fourth value.

FIG. 6A also includes a frequency change ($\delta f$) versus time graph where the times on x-axis plot correspond to the times on the frequency versus time graph as shown by the vertical line labeled c. Multiple frequency change values are shown on the frequency change ($\delta f$) versus time graph. The frequency change values are labeled $df_{m,j}$ where m represents the period index and j represents the cycle index. The value of $df_{m,j}$ represents the difference between the frequency value $f_{m,j}$ and the preceding frequency value $f_{m,j}$ from the same data period. For instance, the value of $df_{m,j}=f_{m,j}-f_{m,j-1}$. As an example, $df_{2,3}=f_{2,3}-f_{2,2}$. As a result, when FIG. 6A shows the frequency values $f_{m,j}$ at substantially constant values, the associated frequency change values ($df_{m,j}$) have a value that is also substantially constant.

FIG. 6A shows the frequency change values associated with object 1 and object 2 as having a frequency change values ($df_{m,j}$) that are substantially at zero. As evident in FIG. 6A, these frequency change values ($df_{m,j}$) are generated for the situation where the system output signal as perpendicular to the surfaces upon which the system output signal is incident. However, as the system output signal becomes less perpendicular on the surface of the object, the frequency change values ($df_{m,j}$) move away from zero. However, there are a variety of factors that interfere with the beat frequency value $f_{m,j}$ (interference factors). Examples of interference factors that affect the beat frequency include, but are not limited to, noise and speckle. These interference factors can move the measured beat frequency in the positive or negative direction and have a stronger influence over the measured beat frequency than the reflection by the surface. As a result of the dominance of these interference factors, the collection of frequency change values ($df_{m,j}$) generated for a surface can be approximated as being centered at zero even when the system output signal is not perpendicular on the surface of the object.

When the system output signal change objects, the frequency change values ($df_{m,j}$) show an identifiable pattern that is evident from the dashed lines within the time window labeled "p" in FIG. 6A. For instance, two adjacent frequency change values ("outside frequency change values" labeled $df_{1,j+3}$ and $df_{2,j+3}$) in the time window labeled "p" both fall outside of an edge identification window that extends from $LL_1$ to $UL_1$. The outside frequency change values are positioned on opposing sides of the edge identification window. Additionally, the outside frequency change values are located between pairs of inside frequency change values. The frequency change values in each pair of inside frequency change values are located next to each other, next to one of the outside frequency change values, and inside of the edge identification window. For instance, the frequency change values labeled $df_{1,j+2}$ and $df_{2,j+2}$ serve as a pair of inside frequency change values in that they are located next to each other, next to the outside frequency change value labeled $df_{1,j+3}$, and inside of the edge identification window. Further, the frequency change values labeled $df_{1,j+4}$ and $df_{2,j+4}$ serve as a pair of inside frequency change values in that they are located next to each other, next to the outside frequency change value labeled $df_{2,j+3}$, and inside of the edge identification window.

Figure 6B:
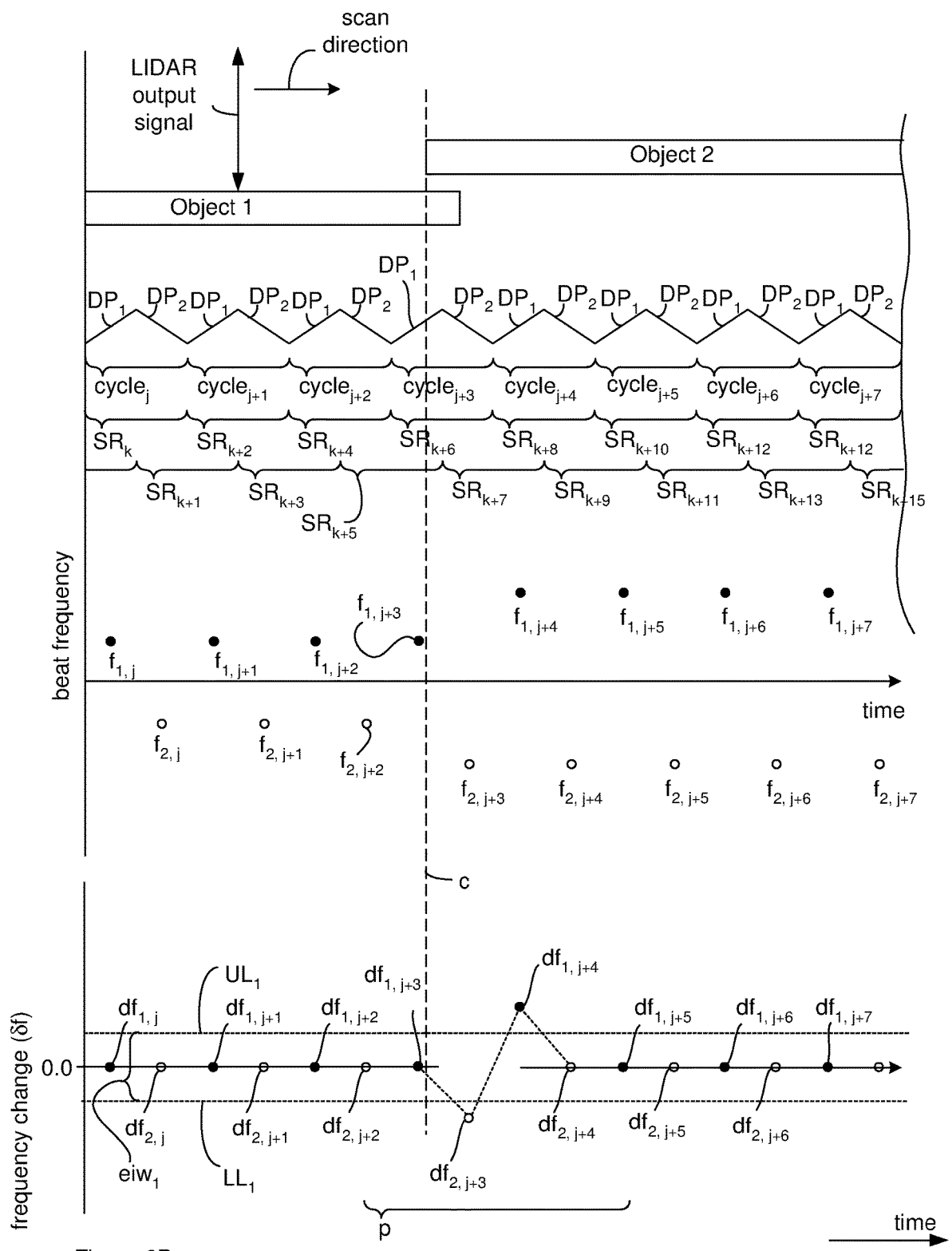
FIG. 6B is a graph illustrating a relationship between a frequency versus time pattern for a system output signal and a beat frequency versus time pattern that occurs when an abrupt edge of an object is present in the field of view of a LIDAR system.

FIG. 6A illustrates the example where the edge is positioned at the interface between data periods, i.e., at the transition between an upramp and a downramp. FIG. 6B illustrates the result of shifting the edge away from this transition to a location on an upramp. In particular, the edge is positioned in the data period labeled $DP_1$ in cycle j+3. As a result, during the data period labeled $DP_1$ in cycle j+3, the system output signal illuminates object 1 and object 2. However, the edge is positioned such that the system output signal illuminates object 1 for a longer period of time than object 2. As a result, output of the output from the transform component 268 shows a more powerful peak for object 1 than object 2. Accordingly, the beat frequency for the data period labeled $DP_1$ in cycle j+3 ($f_{1,j+3}$) reflects the beat frequency of object 1 rather than object 2. FIG. 6B shows the beat frequency labeled ($f_{1,j+3}$) at the about the same beat frequency as the other beat frequencies that result from the illumination of object 1.

FIG. 6B also includes a frequency change versus time graph. The frequency change versus time graph shown in FIG. 6B was developed as described in FIG. 6A. When the system output signal change objects, the frequency change values ($df_{m,j}$) in the frequency change versus time graph show an identifiable pattern that is evident from the dashed lines within the time window labeled "p." For instance, two adjacent frequency change values ("outside frequency change values" labeled $df_{2,j+3}$ and $df_{1,j+4}$) in the time window labeled "p" both fall outside of an edge identification window that extends from $LL_1$ to $UL_1$. The outside frequency change values are positioned on opposing sides of the edge identification window. Additionally, the outside frequency change values are located between pairs of inside frequency change values. The frequency change values in each pair of inside frequency change values are located next to each other, next to one of the outside frequency change values, and inside of the edge identification window. For instance, the frequency change values labeled $df_{2,j+2}$ and $df_{1,j+3}$ serve as a pair of inside frequency change values in that they are located next to each other, next to the outside frequency change value labeled $df_{2,j+3}$, and inside of the edge identification window. Further, the frequency change values labeled $df_{2,j+4}$ and $df_{1,j+5}$ serve as a pair of inside frequency change values in that they are located next to each other, next to the outside frequency change value labeled $df_{1,j+4}$, and inside of the edge identification window.

The electronics can apply edge identification criteria to the frequency change values so as to identify presence of an edge in the field of view. A series of abrupt edge identification criteria can be used to identify the beat frequency versus time patterns disclosed in the context of FIG. 6A through FIG. 6B. For instance, a frequency change values ($df_{m,j}$) at an edge can be included in a series of frequency change values ($df_{m,j}$) where two adjacent outside frequency change values are on opposing sides of the edge identification window and are located between pairs of inside frequency change values. In these instances, the edge occurs during the data period associated with one of the outside frequency change values depending on whether the first outside frequency change value occurs on a frequency chirp upramp or a frequency chirp downramp. As an example, a frequency change values ($df_{m,j}$) at an edge can be identified by identifying the value of m and j where $LL_1 < df_{1,j-1} < UL_1$; $LL_1 < df_{1,j+1} < UL_1$; $LL_1 < df_{2,j-1} < UL_1$; and $LL_1 < df_{2,j+1} < UL_1$. In addition to these four criteria, when $df_{1,j} > UL_1$ and $df_{2,j} < LL_1$ the edge occurs where the period index m=1 in cycle j. Alternately, an edge can be identified by identifying the value of m and j where $LL_1 < df_{2,j-1} < UL_1$; $LL_1 < df_{1,j} < UL_1$; $LL_1 < df_{2,j+1} < UL_1$; and $LL_1 < df_{1,j+2} < UL_1$. In addition to these four criteria, when $df_{2,j} < LL_1$ and $df_{1,j+1} > UL_1$, the edge occurs where the period index m=2 in cycle j. These values of m and j can be used to flag one or more components illustrated in FIG. 6A through FIG. 6B. For instance, one or more components selected from the group consisting of data period m of cycle j, the associated beat frequency ($f_{m,j}$), the associated frequency change values ($df_{m,j}$), and the sample region ($SR_k$) that contains any of these components can be flagged as containing an edge. In the above examples of abrupt edge identification criteria, two inside frequency change values are present on both sides of the outside frequency change values when an abrupt edge is found; however, the abrupt edge identification criteria can have other configurations. For instance, abrupt edge identification criteria can be configured such that one, two, or more than two inside frequency change values are present on both sides of the outside frequency change values in order to find an abrupt edge. As a result, the disclosed edge identification criteria can make use of as few as four frequency change values. In some instances, the edge identification criteria make use of a number of frequency change values that is greater than or equal to 4 and less than or equal to 10.

Figure 7:
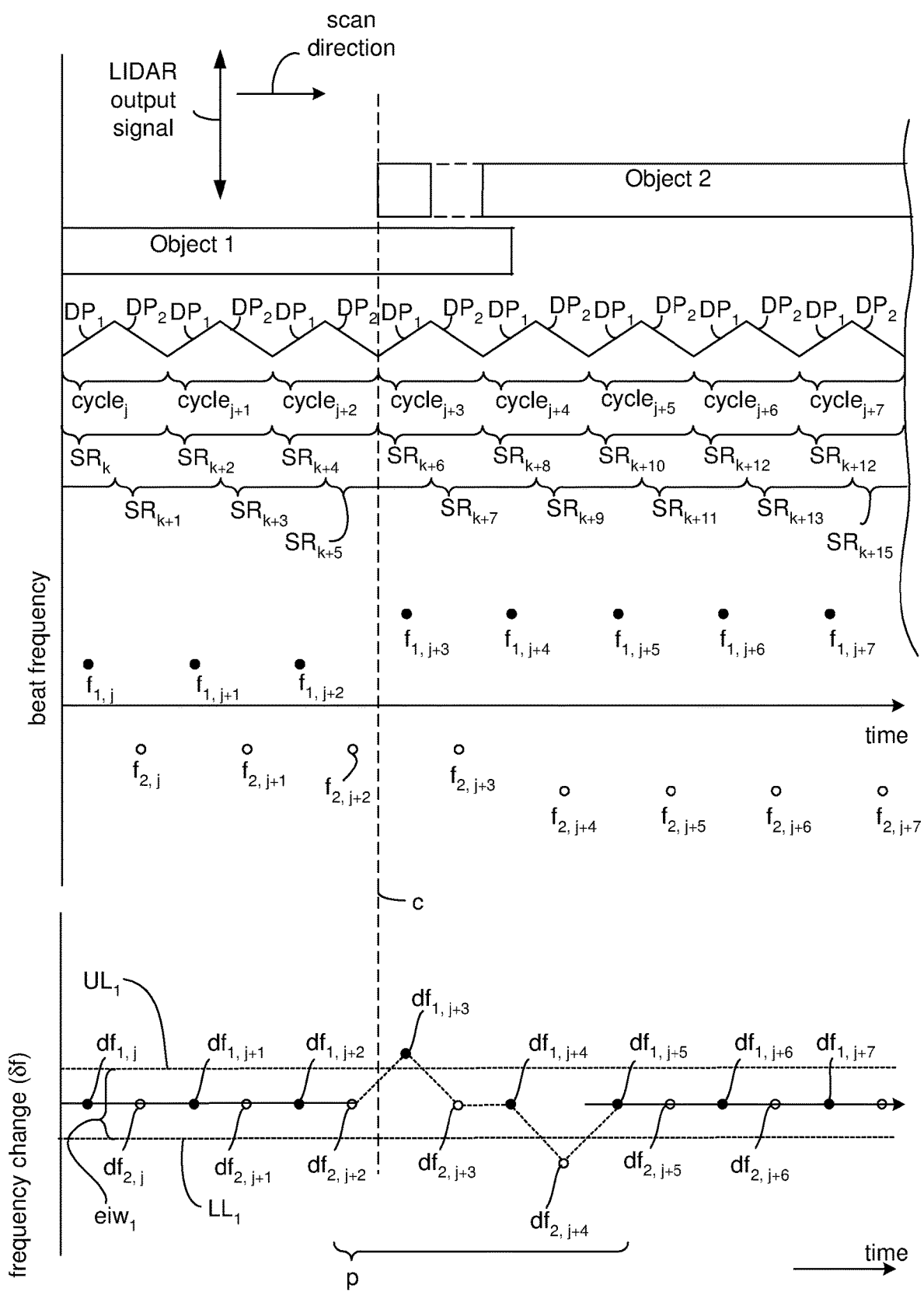
FIG. 7 is a graph illustrating a relationship between a frequency versus time pattern for a system output signal and a beat frequency versus time pattern that occurs when a rough edge of an object is present in the field of view of a LIDAR system.

FIG. 7 illustrates another example of a beat frequency pattern that can be used to identify the location of an edge in the field of view. The pattern is suitable for identifying transitions between different surfaces of an object where one of the surfaces is rough at the transition. Additionally or alternately, the pattern is suitable for identifying transitions between different objects when one of the objects has a surface that is rough at the transition. For the purposes of illustration, FIG. 7 illustrates a transition between different surfaces of an object where one of the surfaces is rough at the transition.

FIG. 7 also includes a frequency change versus time graph that was developed as described in the context of FIG. 6A. When the system output signal changes surfaces, the frequency change values ($df_{m,j}$) show an identifiable pattern that is evident from the dashed lines within the time window labeled "p" in FIG. 7. For instance, two frequency change values ($df_{1,j+3}$ and $df_{2,j+4}$) in the time window labeled "p" serve as outside frequency change values that both fall outside of the edge identification window labeled $eiw_1$ and on opposing sides of the window labeled $eiw_1$. The interior frequency change values ($df_{2,j+3}$ and $df_{1,j+4}$ in FIG. 7) are adjacent to each other, located between the outside frequency change values, and fall within the edge identification window labeled $eiw_1$. Additionally, the outside frequency change values are located between two pairs of inside frequency change values. The inside frequency change values in each pair of inside frequency change values are located next to each other, next to one of the outside frequency change values, and inside of the edge identification window. For instance, the frequency change values labeled $df_{1,j+2}$ and $df_{2,j+2}$ serve as inside frequency change values in that they are located next to each other, next to the outside frequency change value labeled $df_{1,j+3}$, and inside of the edge identification window. Further, the frequency change values labeled $df_{1,j+5}$ and $df_{2,j+5}$ serve as inside frequency change values in that they are located next to each other, next to the outside frequency change value labeled $df_{2,j+4}$, and inside of the edge identification window.

Rough edge identification criteria can be used to identify the beat frequency versus time patterns disclosed in the context of FIG. 7. For instance, the edge identification window can extend from a lower limit labeled $LL_1$ to an upper limit labeled $UL_1$. For instance, a frequency change values ($df_{m,j}$) at a rough edge according to FIG. 7 can be included in a series of frequency change values ($df_{m,j}$) where interior frequency change values are adjacent to each other, located between outside frequency change values, and fall within the edge identification window labeled $eiw_1$. Additionally, the outside frequency change values are located on opposing sides of the edge identification window, between two pairs of inside frequency change values. The inside frequency change values in each pair of inside frequency change values are located next to each other, next to one of the outside frequency change values, and inside of the edge identification window. As an example, a frequency change values ($df_{m,j}$) at a rough edge according to FIG. 7 can be identified by identifying the value of m (period index) and j (cycle index) where the value of m (period index) and j (cycle index) where $LL_1 < df_{2,j-1} < UL_1$; $LL_1 < df_{2,j} < UL_1$; $LL_1 << UL_1$; and $LL_1 < df_{1,j+2} < UL_1$. In addition to these four criteria, when ($df_{1,j} > UL_1$ and $df_{2,j+1} < LL_1$) an edge starts where the period index m=1 in cycle j. Alternately, frequency change values ($df_{m,j}$) at an edge according to FIG. 7 can be identified by identifying the value of m (period index) and j (cycle index) where $LL_1 < df_{1,j} < UL_1$; $LL_1 < df_{1,j+1} < UL_1$; $LL_1 < df_{2,j+1} < UL_1$; and $LL_1 < df_{2,j+2} < UL_1$. In addition to these four criteria, when ($df_{2,j} > UL_1$ and $df_{1,j+2} < LL_1$) an edge starts where the period index m=2 in cycle j. In the above examples of rough edge identification criteria, an inside frequency change value is present on both sides of the outside frequency change values when a rough edge is found; however, the rough edge identification criteria can have other configurations. For instance, rough edge identification criteria can be configured such that one, or more than one inside frequency change values are present on both sides of the outside frequency change values in order to find a rough edge. As a result, the disclosed rough edge identification criteria can make use of as few as six frequency change values. In some instances, the edge identification criteria make use of a number of frequency change values that is greater than or equal to 6 and less than or equal to 12.

The identified values of m and j can be used to identify other edges in the rough edge configuration. For instance, FIG. 7 shows that when an edge starts where the period index m=1 in cycle j, there are also edges at m=2 in cycle j, and at m=1 in cycle j+1. Shifting the object pattern in FIG. 7 also shows that FIG. 7 shows that when an edge starts where the period index m=2 in cycle j, there are also edges at m=1 in cycle j+1, and at m=2 in cycle j+1. The beat frequencies associated with these values of m and j can each serve as an edge beat frequency.

These edge values can be used to flag multiple components illustrated in FIG. 7. For instance, one or more components can be flagged where the one or more components are selected from the group consisting of data period m of cycle j, the associated beat frequency ($f_{m,j}$), the associated frequency change values ($df_{m,j}$), and the sample region ($SR_k$) that contains any of the preceding components. Multiple values of each one of the one or more flagged component can each be flagged. For instance, when the beat frequency is to be flagged, each of the beat frequencies associated with an identified combination of m and j can be flagged in the memory 271. For instance, when the combinations of: m=2 in cycle j; m=1 in cycle j+1; and m=2 in cycle j+1 have been identified: $f_{2,j}$; $f_{1,j+1}$; and $f_{2,j+1}$ can each be flagged as containing an edge. In one example, at least the beat frequency ($f_{m,j}$) stored in the memory 271 is the flagged component and the flagged beat frequency serves as edge beat frequencies.

In addition to edges, outliers can also affect the quality of LIDAR data results. Outliers are data points that provide results that are not consistent with the surrounding data points. For instance, outliers do not necessarily occur at a transition between surfaces but can occur in the middle of a surface. As a result, an outlier can be data from the same surface that is not consistent with other data on that surface.

Figure 8:
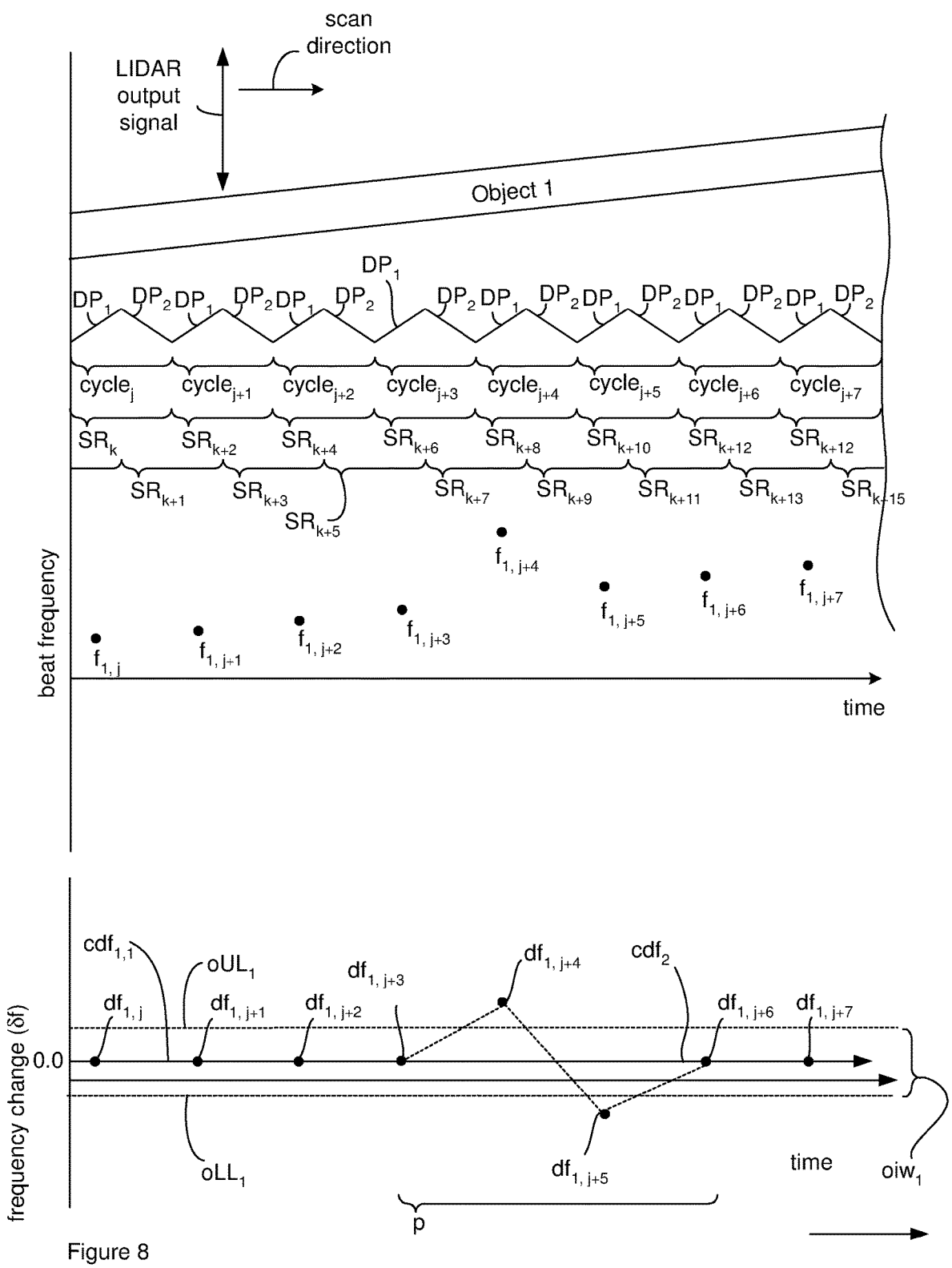
FIG. 8 is a graph illustrating a relationship between a frequency versus time pattern for a system output signal and a beat frequency versus time pattern that occurs when a one of the beat frequencies is an outlier.

The techniques disclosed in the context of FIG. 6A through FIG. 7 can be used to identify isolated outliers. For instance, FIG. 8 shows an object (labeled object 1) positioned on a graph of the beat frequency versus time. The position of the system output signal on a surface of object 1 as a function of time is also shown at the top of the graph. Also shown on FIG. 8 is the frequency versus time pattern of FIG. 5D extended to j+7 cycles.

FIG. 8 also shows the beat frequencies that the peak finder determines for each of the data periods labeled $DP_1$. Because the frequency of the system output signal increases during the data periods labeled $DP_1$, each beat frequency during a data period labeled $DP_1$ can serve as a $f_{ub}$ in the above equations for calculating the LIDAR data. In order to simplify the image, the beat frequencies during the data periods labeled $DP_2$ are not shown in FIG. 8. Because there are multiple $f_{ub}$ values shown in FIG. 8, the $f_{ub}$ values are re-labeled so each value can be uniquely identified. For instance, $f_{ub}$ values are re-labeled $f_{m,j}$ where m represents the period index and j represents the cycle index. Accordingly, $f_{1,3}$ represents the beat frequency determined for $DP_1$ in the third cycle. As a result, the $f_{ub}$ values are each represented by a different one of the $f_{1,j}$ values. In FIG. 8, the $f_{1,j}$ values increase at a substantially linear rate until an outlier is reached.

FIG. 8 also includes a frequency change ($\delta f$) versus time graph where the times on the x-axis correspond to the times on the frequency versus time graph. Multiple frequency change values are shown on the frequency change ($\delta f$) versus time graph. Similar to FIG. 6A through FIG. 7, the frequency change values are labeled $df_{m,j}$ where m represents the period index and j represents the cycle index. The value of $df_{m,j}$ represents the difference between the frequency value $f_{m,j}$ and the preceding frequency value $f_{m,j}$ from the same data period. For instance, the value of $df_{m,j}=f_{m,j}-f_{m,j-1}$. As an example, $df_{1,3}=f_{1,3}-f_{1,2}$. As a result, when FIG. 8 shows the frequency values $f_{m,j}$ increasing substantially linear rate, the associated frequency change values ($df_{m,j}$) have a value that is also substantially constant.

When the beat frequency of the system output signal is an outlier, the frequency change values ($df_{m,j}$) show an identifiable pattern that is evident from the dashed lines within the time window labeled "p" in FIG. 8. Two adjacent frequency change values ($df_{1,j+4}$ and $df_{1,j+5}$) in the time window labeled "p" serve as frequency change values that fall outside of outlier edge identification window labeled $oiw_1$ and on opposing sides of the outlier edge identification window labeled $oiw_1$. Additionally, the outside frequency change values are located between inside frequency change values labeled ($df_{1,j+3}$ and $df_{1,j+6}$). The inside frequency change value labeled $df_{1,j+3}$ is located adjacent to and before one of the outside frequency change values and falls within the outlier identification window ($oiw_1$). Additionally, the inside frequency change value labeled $df_{1,j+6}$ is located adjacent to and after the other outside frequency change value ($df_{1,j+5}$) and falls within the outlier identification window ($oiw_1$).

FIG. 8 illustrates the situation where an outlier exists in the data periods labeled $DP_1$ (m=1) where there is a chirp frequency upramp, however, outliers can also exist in the data periods labeled $DP_2$ (m=2) where there is a chirp frequency downramp. Accordingly, the analysis of FIG. 8 can also be applied to the data periods labeled $DP_2$ (m=2) in order to identify additional outliers.

Outlier identification criteria can be used to identify the beat frequency versus time patterns disclosed in the context of FIG. 8. For instance, an outlier identification window can extend from a lower limit labeled $oLL_1$ to an upper limit labeled $oUL_1$. An outlier can be identified by identifying a series of frequency change values where a pair of outside frequency change values are located between inside frequency change values where the outside frequency change values and the inside frequency change values are generated from the same frequency chirp (m=1 chirp upramp or m=2 chirp downramp). As an example, an outlier can be identified by identifying the value of j (cycle index) where $oLL_1<df_{1,j-1}<oUL_1$ and $oLL_1<df_{1,j+2}<oUL_1$. In addition to these criteria, when ($df_{1,j}>oUL_1$ and $df_{1,j+1}<oLL_1$) an outlier occurs at period index 1 in cycle j. As another example, an outlier can be identified by identifying the value of j (cycle index) where $oLL_1<df_{2,j-1}<oUL_1$ and $oLL_1<df_{2,j+2}<oUL_1$. In addition to these criteria, when ($df_{2,j}<oLL_1$ and $df_{2,j+1}>oUL_1$) an outlier occurs at period index 2 in cycle j. These values of m and j can be used to flag one or more components illustrated in FIG. 8. For instance, one or more components can be flagged as containing an outlier where the components are selected from the group consisting of data period m of cycle j, the associated beat frequency ($f_{m,j}$), the associated frequency change values ($df_{m,j}$), and the sample region ($SR_k$) that contains any of these components. In one example, the associated beat frequencies ($f_{m,j}$) stored in the memory are flagged as an outlier. In the above examples of outlier identification criteria, one inside frequency change values is present on both sides of the outside frequency change values when an outlier is found; however, the outlier identification criteria can have other configurations. For instance, outlier identification criteria can be configured such that one, two, or more than two inside frequency change values are present on both sides of the outside frequency change values in order to find an outlier. As a result, the disclosed outlier identification criteria can make use of as few as four frequency change values. In some instances, the edge identification criteria make use of a number of frequency change values that is greater than or equal to 4 and less than or equal to 10.

The edge identification window ($eiw_1$) can be a constant. For instance, the edge identification window can extend from $LL1=-df/2$ to $UL1=df/2$ where df is a constant. Similarly, the outlier identification window ($oeiw_1$) can be a constant. For instance, the edge identification window can extend from $oLL1=-odf/2$ to $oUL1=odf/2$ where odf is a constant. In some instances, df=odf. The value of df and/or odf can be set in the electronics by the manufacturer, re-seller, end-user, operator of the LIDAR system, and/or other handler of the LIDAR system. The desired values of df and/or odf can be influenced by a variety of factors including, but not limited to, the application of the LIDAR system, the rate of change of the frequency of the system output signal (am), expected interference levels from sources such as noise, and scan speed of the system output signal. In some instances, the value of df and/or odf is selected to be greater than or equal to 0.01 MHz and/or less than or equal to 100 MHz. In one example, the value of df and/or odf is greater than or equal to 0.5 MHz and less than or equal to 2 MHz.

Figure 9:
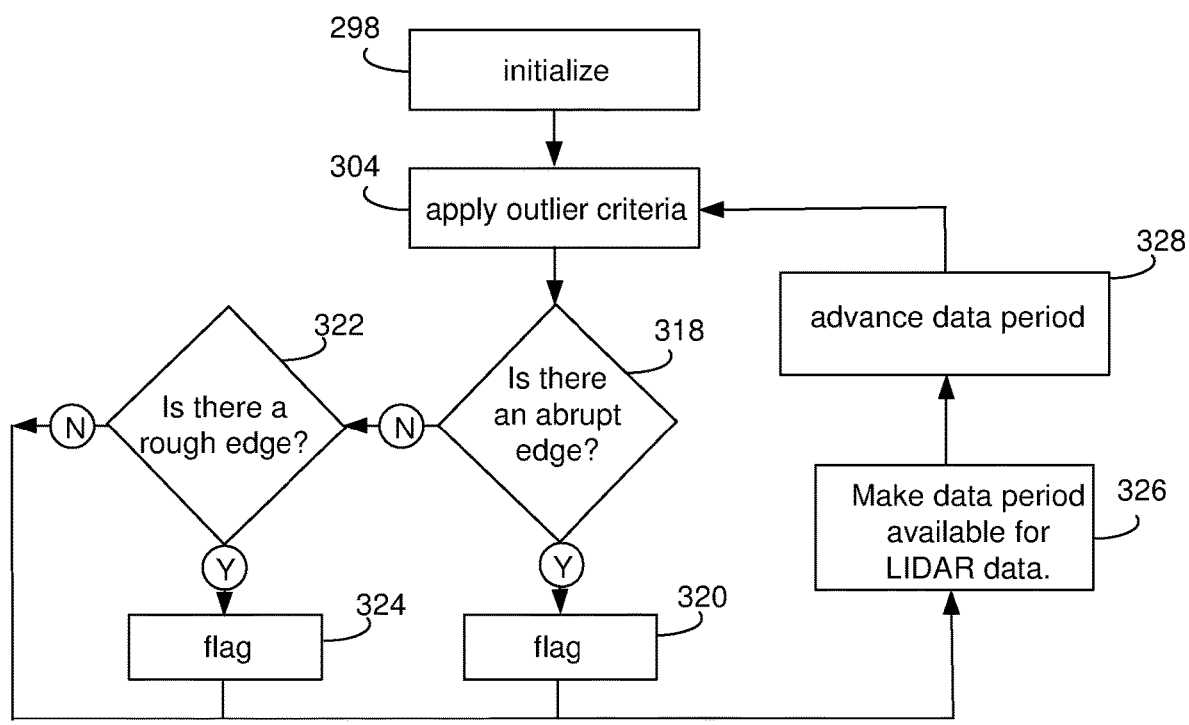
FIG. 9 presents a flow diagram for a data correction process.

FIG. 9 presents a flow diagram for a data correction process that can be performed by the data correction component 272 with access to the beat frequency values stored in the memory. During the data correction process, the data correction component 272 processes data from a series of different data periods. As a result, the data correction process includes process block where the sample region is advanced. As is shown in FIG. 6A through FIG. 8, the time over which the system output signal (SOS) is scanned is divided into multiple data periods. Each of the data period can be identified by a unique combination of the period index m and the cycle index j. As a result, the electronics can advance from one data period to the next data period by changing the values of period index m and the cycle index j from the values of the current data period to the values of the next data period in the sequence. As is evident from FIG. 6A through FIG. 8, in some instances, advancing the data period can include changing the value of period index m without changing the cycle index j or can include changing the value of period index m and the cycle index j.

At process block 298, the data correction component 272 can initialize the data correction process. The following discussion assumes that each cycle includes an upramp in the frequency of the system output signal followed by a downramp in the frequency of the system output signal. Accordingly, the electronics can initialize the data period to be considered by the electronics to the data period with the period index m=1 and the cycle index j=1. The data correction component 272 can receive the beat frequency ($f_{m,j}$) associated with period index m=1 and cycle index j=1 from the peak finder or from the memory 271.

The data correction component 272 can proceed from process block 298 to process block 304 where the data correction component 272 can apply the outlier detection criteria using the current value of the period index m and the cycle index j. For instance, the correction component 272 can determine that an outlier is present when the frequency change value with the current value of the period index m and the cycle index j is the last frequency change value in a series of frequency change values that are each of the same frequency chirp (i.e., m=1 chirp upramp or m=2 chirp downramp) where a pair of outside frequency change values are located on opposing sides of an outlier edge identification window ($oiw_1$) and between inside frequency change values. As an example, the electronics can determine whether $oLL_1<df_{m,j-3}<oUL_1$ and $oLL_1<df_{m,j}<oUL_1$. When these two criteria are met, the data correction component 272 can determine that the data period m in cycle j-2 is an outlier when ($df_{m,j-1}>oUL_1$ and $df_{m,j-2}<oLL_1$) or when ($df_{m,j-1}<oLL_1$ and $df_{m,j-2}>oUL_1$). When the data correction component 272 determines that the data period m in cycle j-2 is an outlier, the electronics can flag as being an outlier one or more components selected from the group consisting of data period m of cycle j-2, the associated beat frequency ($f_{m,j-2}$), and the associated frequency change values ($df_{m,j-2}$). In one example, the associated beat frequency ($f_{m,j-2}$) is flagged in the memory 271 as an outlier.

The data correction component 272 can proceed from process block 304 to determination block 318 where a determination is made whether an abrupt edge is present. For instance, the correction component 272 can determine that an abrupt edge is present when the frequency change value with the current value of the period index m and the cycle index j is the last frequency change value in a series of frequency change values where outside frequency change values are positioned on opposing sides of an edge identification window and are located between pairs of inside frequency change values. As an example, in cases where the current value of m=2, the electronics can determine whether $LL_1<df_{1,j-2}<UL_1$; $LL_1<df_{2,j-2}<UL_1$; $LL_1<df_{1,j}<UL_1$; and $LL_1<df_{2,j}<UL_1$. When these four criteria are met, the data correction component 272 can determine that the data period 1 in cycle j-1 contains an edge when ($df_{1,j-1}>UL_1$ and $df_{2,j-1}<LL_1$) or when ($df_{1,j-1}<UL_1$ and $df_{2,j-1}>LL_1$). When the electronics determine that the data period 1 in cycle j-1 contains an edge, the electronics can flag as containing an edge one or more components selected from the group consisting of $DP_1$ of cycle j-1, the associated beat frequency ($f_{1,j-1}$), and the associated frequency change values ($df_{1,j-1}$) as containing an edge at process block 320. In one example, the associated beat frequency ($f_{1,j-1}$) is flagged in the memory 271 as containing an edge. In cases where the current value of m=1, the data correction component 272 can determine whether $LL_1<df_{2,j-3}<UL_1$; $LL_1<df_{1,j-2}<UL_1$; $LL_1<df_{2,j-1}<UL_1$; and $LL_1<df_{1,j}<UL_1$. When these four criteria are met, the electronics can determine that the data period 2 in cycle j-2 contains an edge when ($df_{1,j-1}>UL_1$ and $df_{2,j-2}<LL_1$) or when ($df_{1,j-1}<UL_1$ and $df_{2,j-1}>LL_1$). When the data correction component 272 determines that data period 2 in cycle j-2 contains an edge, the data correction component 272 can flag as containing an edge one or more components selected from the group consisting of $DP_2$ of cycle j-2, the associated beat frequency ($f_{2,j-2}$), and the associated frequency change values ($df_{2,j-2}$) as containing an edge at process block 320. In one example, the associated beat frequency ($f_{2,j-2}$) is flagged in the memory 271 as containing an edge.

When the determination at determination block 318 is negative, the electronics can proceed from process block 318 to determination block 322 where a determination is made whether a rough edge is present. For instance, the correction component 272 can determine that an rough edge is present when the frequency change value with the current value of the period index m and the cycle index j is the last frequency change value in a series of frequency change values where interior frequency change values are adjacent to each other; the interior frequency change values fall within the edge identification window labeled $eiw_1$ and are located between outside frequency change values; the outside frequency change values are located on opposing sides of the edge identification window and are between two pairs of inside frequency change values that fall within the edge identification window. As an example, in cases where the current value of m=1, the electronics can determine whether $LL_1 < df_{2,j-3} < UL_1$; $LL_1 < df_{2,j-2} < UL_1$; $LL_1 << UL_1$; and $LL_1 < df_{1,j} < UL_1$. When these four criteria are met, the electronics can determine that a rough edge starts at data period 1 in cycle j−2 when ($df_{1,j-2} > UL_1$ and $df_{2,j-1} < LL_1$) or when ($df_{1,j-2} < UL_1$ and $df_{2,j-1} > LL_1$). When the electronics determine that a rough edge starts at data period 1 in cycle j−2, the electronics can flag as containing an edge one or more components selected from the group consisting of $DP_1$ of cycle j−2, $DP_2$ of cycle j−2, and $DP_1$ of cycle j−1, the associated beat frequency ($f_{1,j-2}$, $f_{2,j-2}$, and $f_{1,j-1}$), and the associated frequency change values ($df_{1,j-2}$, $df_{2,j-2}$, and $df_{1,j-1}$) as containing an edge at process block 324. In one example, the associated beat frequencies ($f_{1,j-2}$, $f_{2,j-2}$, and $f_{1,j-1}$) stored in the memory 271 are each flagged as containing an edge. In cases where the current value of m=1, the electronics can determine whether $LL_1 < df_{1,j-2} < UL_1$; $LL_1 << UL_1$; $LL_1 < df_{2,j-1} < UL_1$; and $LL_1 < df_{2,j} < UL_1$. When these four criteria are met, the electronics can determine that a rough edge starts at data period 2 in cycle j−2 when ($df_{2,j-2} > UL_1$ and $df_{1,j} < LL_1$) or when ($df_{2,j-2} < UL_1$ and $df_{1,j} > LL_1$). When the electronics determine that a rough edge starts at data period m=2 in cycle j−2, the electronics can flag as containing an edge one or more components selected from the group consisting of $DP_2$ of cycle j−2, $DP_1$ of cycle j−1, and $DP_2$ of cycle j−1, the associated beat frequency ($f_{2,j-2}$, and $f_{2,j-1}$), and the associated frequency change values ($df_{2,j-2}$, $df_{1,j-1}$, and $df_{2,j-1}$) as containing an edge at process block 324. In one example, the associated beat frequencies ($f_{2,j-2}$, and $f_{2,j-1}$) stored in the memory 271 are each flagged as containing an edge. In some instances, the earliest beat frequency ($f_{2,j-2}$) is flagged as containing an edge.

In some instances, when a beat frequency ($df_{2,j-2}$) is flagged at determination block 318, determination block 322, or process block 304, the beat frequency can be stored in the memory 271 with a second flag that identifies the type of flag. For instance, the second flag can indicate whether the flag is for an outlier, an abrupt edge, or a rough edge. Accordingly, the two flags can work together to flag a beat frequency as an outlier, an abrupt edge, or a rough edge. The generation of the LIDAR data can be adjusted in response to the type of flag indicated by the second flag. As an example, when a beat frequency is flagged and the second flag associated with the same beat frequency indicates that the flagged beat frequency is included in a rough edge, the electronics can identify the other beat frequencies associated with the rough edge. For instance, when a beat frequency ($f_{2,j-2}$) is flagged as being in a rough edge, the electronics can identify beat frequencies $f_{1,j-1}$, and $f_{2,j-1}$ as containing an edge and can process them accordingly.

When a rough edge effect is not found at determination block 322, the electronics can proceed to process block 326. Additionally, the electronics can proceed to process block 326 from process block 320 or from process block 324. At process block 326, the beat frequencies are made available to the LIDAR data generator 274. A portion of the beat frequencies that are made available are flagged as occurring at an edge, occurring an abrupt edge, occurring at a rough edge, or being an outlier while a second portion of the beat frequencies are not flagged or are not flagged as occurring at an edge, occurring an abrupt edge, occurring at a rough edge, or being an outlier. The beat frequency that is made available at process block 326 is not the currently considered beat frequency $f_{m,j}$. A review of the text associated with FIG. 6A through FIG. 6B shows that the beat frequency that is determined to have an edge is two or more data periods before the currently considered beat frequency $f_{m,j}$. A review of FIG. 7 shows that the beat frequency where the rough edge starts occurs four or more data periods before the currently considered beat frequency $f_{m,j}$. A review of FIG. 8 shows that the beat frequency that is found to be an outlier occurs four data periods before the currently considered beat frequency $f_{m,j}$. As a result, the beat frequency made available to the LIDAR data generator 274 can be a function of the operations performed in the data correction process. For instance, when the data correction process includes outlier detection or rough edge detection, the beat frequency from four or more data period before the currently considered beat frequency $f_{m,j}$ can be made available to the LIDAR data generator 274. When the data correction process excludes both outlier detection and rough edge detection, the beat frequency from two or more data period before the currently considered beat frequency $f_{m,j}$ can be made available. As an example where the data correction process includes outlier detection and the currently considered beat frequency is expressed $f_{1,j}$, the data correction process can make the beat frequency $f_{1,j-2}$ available to the LIDAR data generator 274 at process block 326. This delay between the currently considered data period and the available data period means the data correction process and/or LIDAR data generation can follow the scan of the system output signal by as few as four data periods or by as few as six data periods. In some instances, the data correction process and/or LIDAR data generation follows the scan of the system output signal by greater than or equal to 3 data periods or 6 data periods and/or by fewer than 10 data periods. In some instances, the data periods have a duration that is greater than or equal to 0.5 µs, or 2 µs and/or less than 5 µs, or 20 µs.

The data correction component 272 can proceed from process block 326 to process block 328 where the current data period is advanced to the next data period in the scan of the system output signal. The data correction component 272 can return to process block 304 from process block 328.

The operations in the data correction process of FIG. 9 can be performed in other sequences and/or with fewer operations. For instance, the data correction process of FIG. 9 can be performed without a portion of the operations selected from the group consisting of applying outlier criteria at process block 304; applying abrupt edge criteria at determination block 318; and applying rough edge criteria at determination block 322.

The LIDAR data generator 274 uses the beat frequencies and flags stored in the memory 271 to generate the LIDAR data for each of the sample regions. For instance, the LIDAR data generator 274 can use the flags to further adjust the beat frequencies and can use the adjusted beat frequencies to generate the LIDAR data. Examples of adjustments to the beat frequencies include, but are not limited to, replacing a flagged beat frequency with a different value, discarding a flagged beat frequency or treating a beat frequency as unavailable.

The LIDAR data for each sample region can be generated as disclosed in the context of FIG. 5C and/or FIG. 5D (i.e., $f_{ub} = -f_d + \alpha_u \tau$ and $f_{db} = -f_d - \alpha_d \tau$ where $f_{ub} = f_{1,j}$ and $f_{db} = f_{2,j}$). However, a portion of the beat frequencies used to generate the LIDAR data are flagged as having an edge error effect by the data correction component. When a beat frequency that is needed to calculate the LIDAR data for a sample region is flagged as having an edge error effect (an edge beat frequency) by the data correction component, the LIDAR data generator can adjust the value of the LIDAR data for that sample region. For instance, when the LIDAR data generator uses the beat frequency values ($f_{m,j}$ and $f_{m+1,j}$) to calculate LIDAR data for the sample region with sample region index k ($SR_k$) but the beat frequency value $f_{m,j}$ and/or $f_{m+1,j}$ is flagged as having an edge, the LIDAR data generator can set the value of the LIDAR data for sample region index $SR_k$ equal to the LIDAR data that was generated for a different sample region. For instance, the LIDAR data generator can set the value of the LIDAR data for sample region index $SR_k$ equal to the value of the LIDAR data that was previously generated for a different sample region. As an example, the LIDAR data generator can set the value of the LIDAR data for sample region index $SR_k$ equal to the value of the LIDAR data for previous sample region ($SR_{k-1}$). When generating LIDAR data for a sequence of sample regions that each requires use of a beat frequency flagged as having an edge, the electronics can adjust the value of the LIDAR data for each of the sample regions to the value of the LIDAR data for the most recent sample region that did require use of a beat frequency. As an example, when generating LIDAR data for each of the sample regions $SR_{k-3}$ through $SR_k$ requires one or more beat frequencies flagged as having an edge, the LIDAR data generator can set the value of the LIDAR data for each of the sample regions $SR_{k-3}$ through $SR_k$ equal to the LIDAR data for sample region $SR_{k-4}$. As a result, when a portion of the beat frequency values needed to generate the LIDAR data for a sample region are flagged as having an edge error effect, the LIDAR data for that sample region can be available to the electronics for further processing. Examples of further processing include, but are not limited to, image generation, control of self-driving vehicles, point cloud generation, object recognition, and statistical analysis.

All or a portion of the beat frequencies that the LIDAR data generator needs to generate the LIDAR data for a sample region can be flagged as outliers by the data correction component. The electronics can effectively adjust the values of beat frequencies flagged as outliers to an unavailable beat frequency classification. The LIDAR data generator can refrain from generating the LIDAR data for these sample regions and/or can discard the LIDAR data for these sample regions. In either case, the LIDAR data generator classifies the LIDAR data for these sample regions as unavailable for further processing by the LIDAR system. A sample region with LIDAR data that is classified as unavailable can be process as a sample region for which a system return signal did not return to the LIDAR system from an object in the field of view.

FIG. 6A through FIG. 8 illustrate the sample regions arranged as disclosed in the context of FIG. 5D in that the beat frequency from one data period can be used to calculate the LIDAR data for multiple different sample regions. As a result, a beat frequency that is flagged as an outlier can cause more than one sample region to be classified as unavailable. However, the sample regions can be configured as disclosed in the context of FIG. 5C in that beat frequency from each data period is used to calculate the LIDAR data for a single sample region. In these instances, a beat frequency that is flagged as an outlier result in a single sample region being classified as unavailable.

The data correction process can be performed "on the fly" in that the data correction process for sample regions in a field of view are performed while the field of view is being scanned by the system output signal. The data correction process and LIDAR data generation can be performed "on the fly" in that the data correction process and LIDAR data generation for sample regions in a field of view are performed while the field of view is being scanned by the system output signal. However, as noted above, there is a time delay between a data period being that the current data period considered by the data correction component 272 and the beat frequency for that data period being made available to the LIDAR data generator. This delay can result in the data correction process following the scan of the system output signal by greater than or equal to 2 data periods or 4 data periods and/or by fewer than 6 or 10 data periods. Since the generation of LIDAR data for a sample region requires the beat frequency from two data periods, the generation of LIDAR data for each sample region can follow the scanning of the sample region by 2 or more data periods. In some instances, the data periods have a duration that is greater than or equal to 0.5 µs, or 2 µs and less than 5 µs, or 20 µs.

In the above description, the peak finder stores the beat frequencies in a memory 271 that is accessed by the data correction component and/or the LIDAR data generator; however, because the data correction and/or LIDAR data generation can be performed "on-the-fly," storage in memory 271 is optional. For instance, in some instances, the peak finder passes the beat frequencies to the data correction component and the data correction component passes the beat frequencies and any associated flags to the LIDAR data generator without storage of the beat frequencies and/or flags in the memory.

The frequency versus time graphs of FIG. 5C through FIG. 5D and FIG. 6A through FIG. 8 show two data periods per sample region and two data periods per cycle. However, each sample region can be associated with more than two data periods. For instance, more than one object or surface can be present in a sample region. The use of additional data periods in a cycle can be used to differentiate the different objects in a sample region.

Suitable electronics 32 can include, but are not limited to, a controller that includes or consists of analog electrical circuits, digital electrical circuits, processors, microprocessors, digital signal processors (DSPs), Field Programmable Gate Arrays (FPGAs), computers, microcomputers, or combinations suitable for performing the operation, monitoring and control functions described above. In some instances, the controller has access to a memory that includes instructions to be executed by the controller during performance of the operation, control and monitoring functions. In some instances, the functions of the LIDAR data generator, the data correction component 272, peak finder can be executed by Field Programmable Gate Arrays (FPGAs), digital signal processors (DSPs), Application Specific Integrated Circuits, firmware, software, hardware, and combinations thereof. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Figure 10:
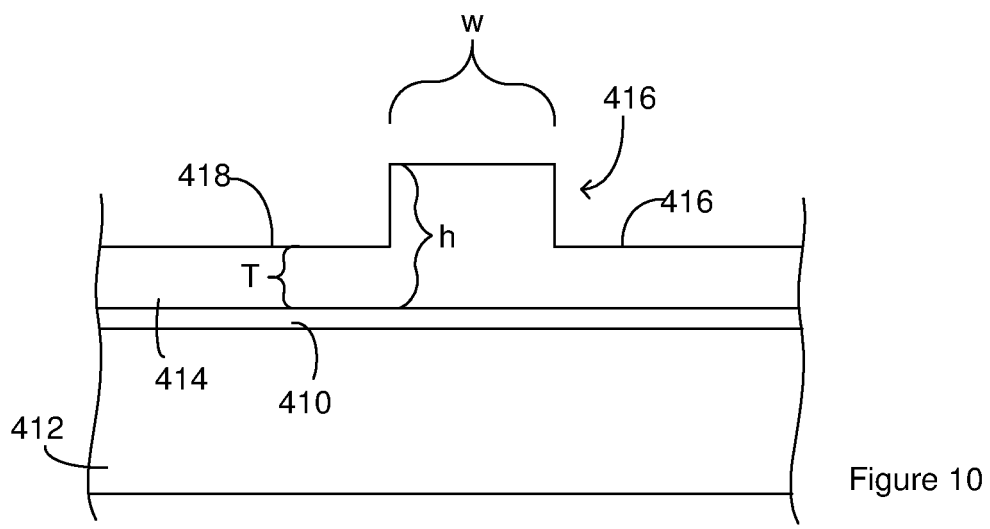
FIG. 10 is a cross-section of portion of a LIDAR chip that includes a waveguide on a silicon-on-insulator platform.

Suitable platforms for the LIDAR chips include, but are not limited to, silica, indium phosphide, and silicon-on-insulator wafers. FIG. 10 is a cross-section of portion of a chip constructed from a silicon-on-insulator wafer. A silicon-on-insulator (SOI) wafer includes a buried layer 410 between a substrate 412 and a light-transmitting medium 414. In a silicon-on-insulator wafer, the buried layer 410 is silica while the substrate 412 and the light-transmitting medium 414 are silicon. The substrate 412 of an optical platform such as an SOI wafer can serve as the base for the entire LIDAR chip. For instance, the optical components shown on the LIDAR chips of FIG. 1A through FIG. 1C can be positioned on or over the top and/or lateral sides of the substrate 412.

The portion of the chip illustrated in FIG. 10 includes a waveguide construction that is suitable for use in LIDAR chips constructed from silicon-on-insulator wafers. A ridge 416 of the light-transmitting medium 414 extends away from slab regions 418 of the light-transmitting medium. The light signals are constrained between the top of the ridge 416 and the buried oxide layer 410.

The dimensions of the ridge waveguide are labeled in FIG. 10. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.5 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternatively, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5 μm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction disclosed in the context of FIG. 10 is suitable for all or a portion of the waveguides on LIDAR chips constructed according to FIG. 1A through FIG. 1C.

Light sensors that are interfaced with waveguides on a LIDAR chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first auxiliary light sensor 218, the second auxiliary light sensor 220, the first light sensor 223, and the second light sensor 224.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10, 2012; U.S. Pat. No. 8,242,432, issued Aug. 14, 2012; and U.S. Pat. No. 6,108,847, issued on Aug. 22, 2000 each of which is incorporated herein in its entirety. The use of light sensors that are integrated with the chip are suitable for all or a portion of the light sensors selected from the group consisting of the auxiliary light sensor 218, the second auxiliary light sensor 220, the first light sensor 223, and the second light sensor 224.

The light source 4 that is interfaced with the utility waveguide 12 can be a laser chip that is separate from the LIDAR chip and then attached to the LIDAR chip. For instance, the light source 4 can be a laser chip that is attached to the chip using a flip-chip arrangement. Use of flip-chip arrangements is suitable when the light source 4 is to be interfaced with a ridge waveguide on a chip constructed from silicon-on-insulator wafer. Alternately, the utility waveguide 12 can include an optical grating (not shown) such as Bragg grating that acts as a reflector for an external cavity laser. In these instances, the light source 4 can include a gain element that is separate from the LIDAR chip and then attached to the LIDAR chip in a flip-chip arrangement. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23, 1999; each of which is incorporated herein in its entirety. When the light source 4 is a gain element or laser chip, the electronics 32 can change the frequency of the outgoing LIDAR signal by changing the level of electrical current applied to through the gain element or laser cavity.

The above LIDAR systems include multiple optical components such as a LIDAR chip, LIDAR adapters, light source, light sensors, waveguides, and amplifiers. In some instances, the LIDAR systems include one or more passive optical components in addition to the illustrated optical components or as an alternative to the illustrated optical components. The passive optical components can be solid-state components that exclude moving parts. Suitable passive optical components include, but are not limited to, lenses, mirrors, optical gratings, reflecting surfaces, splitters, demultiplexers, multiplexers, polarizers, polarization splitters, and polarization rotators. In some instances, the LIDAR systems include one or more active optical components in addition to the illustrated optical components or as an alternative to the illustrated optical components. Suitable active optical components include, but are not limited to, optical switches, phase tuners, attenuators, steerable mirrors, steerable lenses, tunable demultiplexers, tunable multiplexers.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:
1. A system, comprising:
    a LIDAR system configured to output a system output signal such that a frequency of the system output signal changes in a series of repeated cycles, each of the cycles includes multiple data periods,
the frequency of the system output signal changing at a different rate during different data periods,
the LIDAR system being configured to scan the system output signal through multiple sample regions in a field of view;
the LIDAR system including a light-combining component that combines light that returns to the LIDAR system from the system output signal with light from a reference signal so as to generate a beating signal beating at a beat frequency,
the reference signal including light that has not exited from the LIDAR system; and
electronics generate frequency change data that indicates a beat frequency change over time, the beat frequency change being a change in the beat frequency between different data periods, and
the electronics generating LIDAR data for each sample region in at least a portion of the multiple sample regions such that the LIDAR data generated for each sample region is generated between 2 and 6 data periods after scanning the sample region, and
the electronics using the beat frequency values as variables in calculations of the LIDAR data generated for each of the sample regions,
the LIDAR data generated for each sample region indicating a radial velocity and/or distance between the LIDAR system and an object outside of the LIDAR system and in the sample region, and
the electronics adjusting the LIDAR data in response to the frequency change data.

2. The system of claim 1, wherein the frequency change data includes multiple beat frequency change values that each indicates a change in the beat frequency between the data periods in different cycles.

3. The system of claim 2, wherein corresponding data periods in different cycles have the same rate of frequency change and each of the beat frequency change values indicates a change in the beat frequency between corresponding data periods in different cycles.

4. The system of claim 3, wherein each of the cycles includes first data periods that correspond with a different data period in the other cycles and also includes second data periods that correspond with a different data period in the other cycles.

5. The system of claim 4, wherein a first portion of the beat frequency change values indicates a change in the beat frequency between first data periods and a second portion of the beat frequency change values indicates a change in the beat frequency between second data periods.

6. The system of claim 5, wherein the electronics apply criteria to the frequency change data so as to identify a data period where the system output signal illuminates an edge of a surface of an object, and the electronics adjust the LIDAR data in response to the identification of the data period.

7. The system of claim 6, wherein the electronics apply edge detection criteria to the frequency change data so as to identify the data period where the system output signal illuminates an edge of a surface of an object.

8. The system of claim 7, wherein the electronics use at least one beat frequency change value from the first portion of the beat frequency change values and at least one beat frequency change value from the second portion of the beat frequency change values to apply the edge detection criteria to the frequency change data.

9. The system of claim 7, wherein fewer than 10 frequency change values are needed to apply the edge detection criteria to the frequency change data.

10. The system of claim 3, wherein the electronics apply outlier detection criteria to the frequency change data so as to identify beat frequencies that are outliers and the electronics adjust the LIDAR data in response to the identification of the beat frequencies that are outliers.

11. The system of claim 10, wherein outlier detection criteria use frequency change values from multiple different cycles, and
each of the frequency change values in the outlier detection criteria indicates a change in the beat frequency between data periods that have the same rate of frequency change but are from different cycles.

12. The system of claim 10, wherein the electronics apply edge detection criteria to the frequency change data so as to identify a data period where the system output signal illuminates an edge of a surface of an object, and
the electronics apply the outlier detection criteria to a particular one of the data periods before the electronics apply the edge detection criteria to the particular data period.

13. The system of claim 1, wherein the electronics are configured to use the beat frequencies from different data periods as a variable in calculating the LIDAR data for each of the sample regions in the portion of the sample regions.

14. The system of claim 1, wherein the LIDAR data for each sample region is generated between 1 and 50 microseconds after scanning the sample region.

15. The system of claim 1, wherein the
electronics apply outlier detection criteria to the frequency change data so as to identify beat frequencies that are outliers, and
the electronics do not calculate the LIDAR data for a sample region when a beat frequency generated during the scan of the sample region is identified as an outlier.

16. The system of claim 1, wherein the
electronics apply edge detection criteria to the frequency change data so as to identify edge beat frequencies that each occur during one of the data periods where the system output signal illuminates an edge of a surface of an object during the data period,
the electronics adjusting the LIDAR data for one of the sample regions as a result one or more of the identified beat frequencies being a variable in a calculation that electronics use to calculate the LIDAR data for that sample region.

17. The system of claim 16, wherein adjusting the LIDAR data for a sample region includes setting the LIDAR data for the sample region equal to the LIDAR data for a second sample region where none of the identified beat frequencies is a variable in the calculation that electronics use to calculate the LIDAR data for the second sample region.

18. The system of claim 1, wherein the electronics are configured to identify one or more different patterns in the beat frequency change over time and to adjust the LIDAR data in response to the identification of one of the patterns.

19. A method of operating a LIDAR system, comprising:
transmitting a system output signal from the LIDAR system such that a frequency of the system output signal changes in a series of repeated cycles,
each of the cycles includes multiple data periods,
the frequency of the system output signal changing at a different rate during different data periods;
scanning the system output signal through multiple sample regions in a field of view;

combining light that returns to the LIDAR system from the system output signal with light from a reference signal so as to generate a beating signal beating at a beat frequency,
the reference signal including light that has not exited from the LIDAR system;
generating frequency change data that indicates a beat frequency change over time, the beat frequency change being a change in the beat frequency between different data periods;
generating LIDAR data for each sample region in at least a portion of the multiple sample regions such that the LIDAR data generated for each sample region is generated between 2 and 6 data periods after scanning the sample region; and
adjusting the LIDAR data in response to the frequency change data,
the LIDAR data generated for each sample region indicating a radial velocity and/or distance between the LIDAR system and an object located outside of the LIDAR system and in the sample region.

20. A system, comprising:
a LIDAR system configured to output a system output signal such that a frequency of the system output signal changes in a series of repeated cycles,
each of the cycles includes multiple data periods,
the frequency of the system output signal changing at a different rate during different data periods,
the LIDAR system being configured to scan the system output signal through multiple sample regions in a field of view;
the LIDAR system including a light-combining component that combines light that returns to the LIDAR system from the system output signal with light from a reference signal so as to generate a beating signal beating at a beat frequency,
the reference signal including light that has not exited from the LIDAR system; and
electronics generate frequency change data that indicates a beat frequency change over time, the beat frequency change being a change in the beat frequency between different data periods,
the electronics generating LIDAR data for each sample region in at least a portion of the multiple sample regions such that the LIDAR data generated for each sample region is generated between 1 and 50 microseconds after scanning the sample region,
the electronics using the beat frequency values as variables in calculations of the LIDAR data generated for each sample region,
the LIDAR data generated for each sample region indicating a radial velocity and/or distance between the LIDAR system and an object that is outside of the LIDAR system and in the sample region, and,
the electronics adjusting the LIDAR data in response to the frequency change data.

21. The system of claim 20, wherein the frequency change data includes multiple beat frequency change values that each indicates a change in the beat frequency between the data periods in different cycles.

22. The system of claim 21, wherein corresponding data periods in different cycles have the same rate of frequency change and each of the beat frequency change values indicates a change in the beat frequency between corresponding data periods in different cycles.

23. The system of claim 22, wherein each of the cycles includes first data periods that correspond with a different data period in the other cycles and also includes second data periods that correspond with a different data period in the other cycles.

24. The system of claim 23, wherein a first portion of the beat frequency change values indicates a change in the beat frequency between first data periods and a second portion of the beat frequency change values indicates a change in the beat frequency between second data periods.

25. The system of claim 24, wherein the electronics apply criteria to the frequency change data so as to identify a data period where the system output signal illuminates an edge of a surface of an object, and the electronics adjust the LIDAR data in response to the identification of the data period.

26. The system of claim 25, wherein the electronics apply edge detection criteria to the frequency change data so as to identify the data period where the system output signal illuminates an edge of a surface of an object.

27. The system of claim 26, wherein the electronics use at least one beat frequency change value from the first portion of the beat frequency change values and at least one beat frequency change value from the second portion of the beat frequency change values to apply the edge detection criteria to the frequency change data.

28. The system of claim 26, wherein fewer than 10 frequency change values are needed to apply the edge detection criteria to the frequency change data.

29. The system of claim 22, wherein the electronics apply outlier detection criteria to the frequency change data so as to identify beat frequencies that are outliers and the electronics adjust the LIDAR data in response to the identification of the beat frequencies.

30. The system of claim 29, wherein outlier detection criteria use frequency change values from multiple different cycles, and
each of the frequency change values in the outlier detection criteria indicates a change in the beat frequency between data periods that have the same rate of frequency change but are from different cycles.

31. The system of claim 29, wherein the electronics apply edge detection criteria to the frequency change data so as to identify a data period where the system output signal illuminates an edge of a surface of an object, and
the electronics apply the outlier detection criteria to a particular one of the data periods before the electronics apply the edge detection criteria to the particular data period.

32. The system of claim 20, wherein the electronics are configured to use the beat frequencies from different data periods as a variable in calculating the LIDAR data for each of the sample regions in the portion of the sample regions.

33. The system of claim 20, wherein the electronics apply outlier detection criteria to the frequency change data so as to identify beat frequencies that are outliers, and
the electronics do not calculate the LIDAR data for a sample region when a beat frequency generated during the scan of the sample region is identified as an outlier.

34. The system of claim 20, wherein the electronics apply edge detection criteria to the frequency change data so as to identify edge beat frequencies that each occur during one of the data periods where the system output signal illuminates an edge of a surface of an object during the data period,
the electronics adjusting the LIDAR data for one of the sample regions as a result one or more of the identified beat frequencies being a variable in a calculation that electronics use to calculate the LIDAR data for that sample region.

35. The system of claim 34, wherein adjusting the LIDAR data for a sample region includes setting the LIDAR data for the sample region equal to the LIDAR data for a second sample region where none of the identified beat frequencies is a variable in the calculation that electronics use to calculate the LIDAR data for the second sample region.

36. The system of claim 20, wherein the electronics are configured to identify one or more different patterns in the beat frequency change over time and to adjust the LIDAR data in response to the identification of one of the patterns.

37. A method of operating a LIDAR system, comprising:

transmitting a system output signal from the LIDAR system such that a frequency of the system output signal changes in a series of repeated cycles, each of the cycles includes multiple data periods, the frequency of the system output signal changing at a different rate during different data periods;

scanning the system output signal through multiple sample regions in a field of view;

combining light that returns to the LIDAR system from the system output signal with light from a reference signal so as to generate a beating signal beating at a beat frequency, the reference signal including light that has not exited from the LIDAR system;

generating frequency change data that indicates a beat frequency change over time, the beat frequency change being a change in the beat frequency between different data periods;

generating LIDAR data for each sample region in at least a portion of the multiple sample regions such that the LIDAR data generated for each sample region is generated between 1 and 50 microseconds after scanning the sample region; and adjusting the LIDAR data in response to the frequency change data, the LIDAR data for each sample region indicating a radial velocity and/or distance between the LIDAR system and an object that is located outside of the LIDAR system and in the sample region.

* * * * *